(12) United States Patent
Faase et al.

(10) Patent No.: US 11,857,965 B2
(45) Date of Patent: Jan. 2, 2024

(54) MICROFLUIDIC VALVES

(71) Applicant: Hewlett-Packard Development Company, L.P., Spring, TX (US)

(72) Inventors: Kenneth James Faase, Corvallis, OR (US); John Michael Lahmann, Corvallis, OR (US); Paul Mark Haines, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 132 days.

(21) Appl. No.: 17/411,684

(22) Filed: Aug. 25, 2021

(65) Prior Publication Data
US 2023/0062281 A1 Mar. 2, 2023

(51) Int. Cl.
*B01L 3/00* (2006.01)
*F16K 99/00* (2006.01)

(52) U.S. Cl.
CPC ... *B01L 3/502738* (2013.01); *B01L 3/502715* (2013.01); *F16K 99/0055* (2013.01); *B01L 2200/0689* (2013.01); *B01L 2300/046* (2013.01); *B01L 2400/0683* (2013.01)

(58) Field of Classification Search
CPC ......... B01L 3/502738; B01L 3/502715; B01L 2200/0689; B01L 2300/046; B01L 2400/0683; F16K 99/0055
See application file for complete search history.

(56) References Cited

U.S. PATENT DOCUMENTS

| | | | |
|---|---|---|---|
| 7,784,495 B2 | 8/2010 | Prakash et al. | |
| 9,822,356 B2 | 11/2017 | Ismagilov et al. | |
| 10,207,269 B2 | 2/2019 | Ismagilov et al. | |
| 2017/0225161 A1 | 8/2017 | Begolo et al. | |
| 2017/0291747 A1* | 10/2017 | Janta | B65D 75/367 |

OTHER PUBLICATIONS

Chiarello et al., Generation of Oil Droplets in a Non-Newtonian Liquid Using a Microfluidic T-Junction, Micromachines, vol. 6, 2015, pp. 1825-1835.

* cited by examiner

*Primary Examiner* — Jennifer Wecker
*Assistant Examiner* — Jonathan Bortoli
(74) *Attorney, Agent, or Firm* — Foley & Lardner LLP

(57) ABSTRACT

A microfluidic valve can include a substrate having a microfluidic channel formed in the substrate. A sealing layer can be over the microfluidic channel. A flexible blister layer can be over the sealing layer. The flexible blister layer can include a blister formed as a distended portion with a blister volume between the flexible blister layer and the sealing layer. The microfluidic valve can be actuatable by puncturing the sealing layer by pressing on the blister. Actuating the microfluidic valve can either allow fluid to flow through the microfluidic channel or block fluid from flowing through the microfluidic channel.

20 Claims, 11 Drawing Sheets

MICROFLUIDIC VALVES

BACKGROUND

Microfluidic devices are used in a variety of fields including biomedical, chemical, and environmental testing. These devices can involve the flow of very small volumes of fluid through microfluidic channels. Various devices can be designed to mix multiple fluids, dilute fluids, perform chemical reactions between fluids, measure properties of fluids, or process fluids in other ways. In some cases, the flow of fluids through a microfluidic device can be controlled using valves. Some microfluidic devices have included valves such as small rotary valves, ball spring valves, bubble valves, and others.

BRIEF DESCRIPTION OF THE DRAWING

FIGS. 6A-60 illustrate a process of opening an example normally-closed microfluidic valve in accordance with the present disclosure;

DETAILED DESCRIPTION

Figure 1A:
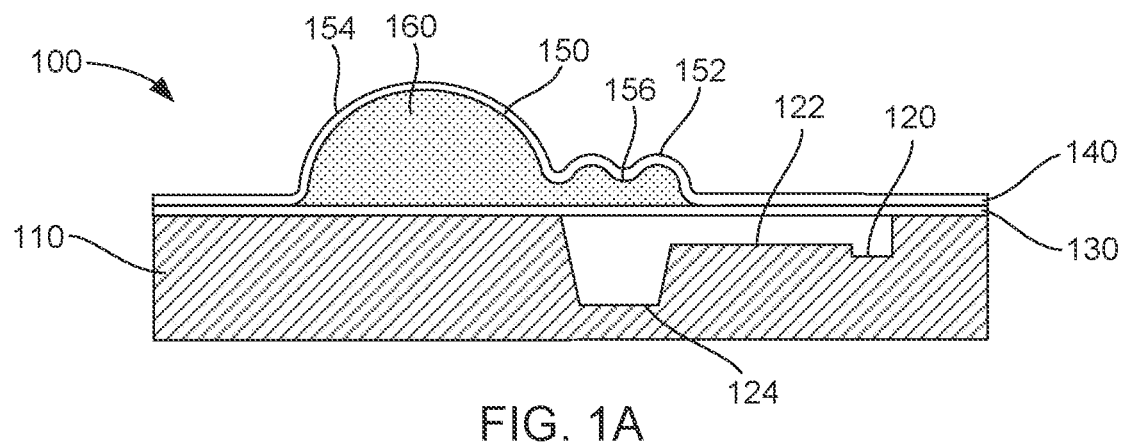
FIG. 1A is a side cross-sectional view of an example microfluidic valve in accordance with the present disclosure.

The present disclosure describes microfluidic valves that utilize a flexible blister that can be pressed to actuate the microfluidic valves. The microfluidic valves include normally-open valves and normally-closed valves. According to the present disclosure, a microfluidic valve includes a substrate having a microfluidic channel formed in the substrate. A sealing layer is over the microfluidic channel. A flexible blister layer is over the sealing layer, wherein the flexible blister layer includes a blister formed as a distended portion with a blister volume between the flexible blister layer and the sealing layer. The microfluidic valve is actuatable by puncturing the sealing layer by pressing on the blister. Actuating the microfluidic valve either allows fluid to flow through the microfluidic channel or blocks fluid from flowing through the microfluidic channel. The microfluidic valve can be a normally-open valve; in which a non-newtonian plugging fluid is in the blister volume. The blister can be positioned to inject the non-newtonian plugging fluid into the microfluidic channel when the blister is pressed and the sealing layer is punctured. The non-newtonian plugging fluid can have a sufficient viscosity to block fluid from flowing through the microfluidic channel. In some examples, the substrate can include a puncturing point beneath the blister oriented toward the sealing layer to puncture the sealing layer when the blister is pressed. In other examples, the flexible blister layer can include a puncturing point at the blister, where the puncturing point is oriented toward the sealing layer to puncture the sealing layer when the blister is pressed. In certain examples, the non-newtonian plugging fluid can be in the blister volume at the puncturing point such that a single press of the blister punctures the sealing layer and injects the non-newtonian plugging fluid into the microfluidic channel. The non-newtonian plugging fluid can be a Bingham plastic, a viscoplastic, a shear thinning fluid, or a curable fluid. The microfluidic valve can also be a normally-closed valve. In such examples, the microfluidic channel can be a first microfluidic channel and the substrate can also include a second microfluidic channel formed in the substrate. The second microfluidic channel can be in fluid communication with the blister, and the sealing layer can separate the blister from fluid communication with the first microfluidic channel. Puncturing the sealing layer can place the blister into fluid communication with the first microfluidic channel to allow fluid to flow between the first microfluidic channel and the second microfluidic channel through the blister volume. The blister volume can be initially filled with air in some cases. The microfluidic valves can also include an opening well formed in the substrate under the blister. The opening well can be in fluid communication with the microfluidic channel, and the opening well can have a greater depth, width, or both compared to the microfluidic channel.

The present disclosure also describes microfluidic devices. A microfluidic device includes a substrate having a fluid flow microfluidic channel formed in the substrate. A microfluidic valve is positioned in fluid communication with the fluid flow microfluidic channel such that the microfluidic valve initially allows or blocks fluid flow through the fluid flow microfluidic channel. The microfluidic valve includes a sealing layer over the fluid flow microfluidic channel and a flexible blister layer over the sealing layer. The flexible blister layer includes a blister formed as a distended portion with a blister volume between the flexible blister layer and the sealing layer. The microfluidic valve is actuatable by puncturing the sealing layer by pressing on the blister, wherein actuating the microfluidic valve switches the microfluidic valve from allowing fluid flow to blocking fluid flow or from blocking fluid flow to allowing fluid flow. In some examples, the microfluidic valve can be a normally-open valve that initially allows fluid flow through the fluid flow microfluidic channel. A non-newtonian plugging fluid can be in the blister volume. The blister can be positioned to inject the non-newtonian plugging fluid into the fluid flow microfluidic channel when the blister is pressed and the sealing layer is punctured. The non-newtonian plugging fluid can have a sufficient viscosity to block fluid from flowing through the fluid flow microfluidic channel. The microfluidic device can also include a second microfluidic valve that is a normally-closed microfluidic valve. The second microfluidic valve can include a second blister formed in the flexible blister layer, and the substrate can also include a second microfluidic channel formed in the substrate, where the second microfluidic channel is in fluid communication with the second blister. The sealing layer can separate the second blister from fluid communication with the fluid flow microfluidic channel. Puncturing the sealing layer can place the second blister into fluid communication with the fluid flow microfluidic channel to allow fluid to flow between the fluid flow microfluidic channel and the second microfluidic channel through the second blister volume.

The present disclosure also describes methods of directing fluids. A method of directing fluids includes flowing a fluid through a fluid flow microfluidic channel formed in a substrate, wherein a microfluidic valve is positioned in fluid communication with the fluid flow microfluidic channel such that the microfluidic valve initially allows or blocks fluid flow through the fluid flow microfluidic channel. The microfluidic valve includes a sealing layer over the fluid flow microfluidic channel and a flexible blister layer over the sealing layer. The flexible blister layer includes a blister formed as a distended portion with a blister volume between the flexible blister layer and the sealing layer. The method also includes actuating the microfluidic valve by puncturing the sealing layer by pressing on the blister. Actuating the microfluidic valve switches the microfluidic valve from allowing fluid flow to blocking fluid flow or from blocking fluid flow to allowing fluid flow. In some examples, the microfluidic valve can be a normally-open valve, and flowing fluid through the fluid flow microfluidic channel is performed before actuating the microfluidic valve. Actuating the microfluidic valve can stop the fluid flow. The normally-open valve can include a non-newtonian plugging fluid in the blister volume, wherein pressing the blister punctures the sealing layer and injects the non-newtonian plugging fluid into the fluid flow microfluidic channel. The non-newtonian plugging fluid can have a sufficient viscosity to block fluid from flowing through the fluid flow microfluidic channel. In further examples, flowing the fluid through the fluid flow microfluidic channel can include flowing the fluid in a first direction, and the method can also include actuating a second microfluidic valve, which is a normally-closed valve, to allow the fluid to flow in a second direction. The second microfluidic valve can include a second blister formed in the flexible blister layer, and the substrate can include a second microfluidic channel formed in the substrate, wherein the second microfluidic channel is in fluid communication with the second blister. The sealing layer can separate the second blister from fluid communication with the fluid flow microfluidic channel. Puncturing the sealing layer can place the second blister into fluid communication with the fluid flow microfluidic channel to allow fluid to flow between the fluid flow microfluidic channel and the second microfluidic channel through the second blister volume.

It is noted that when discussing examples of microfluidic valves, microfluidic devices, and methods of directing fluids described herein, such discussions can be considered applicable to one another whether or not they are explicitly discussed in the context of that example. Thus, for example, when discussing a non-newtonian plugging fluid in a microfluidic valve, such disclosure is also relevant to and directly supported in the context of a microfluidic device or a method of directing fluids, and vice versa.

Terms used herein will have the ordinary meaning in the relevant technical field unless specified otherwise. In some instances, there are terms defined more specifically throughout the specification or included at the end of the present specification, and thus, these terms can have a meaning as described herein.

Microfluidic Valves

A variety of microfluidic devices and microfluidic processes can benefit from valves to control the flow of fluid through microfluidic channels. However, it can be difficult to design and manufacture valves for the small scale of microfluidic channels, which can have small sizes such as less than 1 mm down to 1 µm in diameter or width. Mechanical valves are often used in larger systems such as pipes and tubing, but these types of valves can be complex and expensive to miniaturize. Some microfluidic applications call for disposable and consumable microfluidic devices, such as one-time-use devices that are used to process biological samples. Using expensive miniaturized mechanical valves can add greatly to the cost of such disposable devices. Additionally, valves in microfluidic devices can encounter different forces than in larger devices. For example, forces due to surface tension can have a much larger effect on fluid flow in small-scale devices. Some types of non-mechanical valves have been used, such as capillary breaks and bubble valves. These can provide separation between fluids in different parts of a microfluidic channel, but these types of valves do not provide a hermetic seal and the separation can be broken quite easily if any pressure is applied to the fluids to move the bubble or break the capillary barrier.

The microfluidic valves described herein can be more robust, simpler, and cheaper compared to the other types of valves previously used. The microfluidic valves utilize a flexible blister that can be pressed to actuate the valve. Pressing the blister can either open or close the valve, depending on whether the valve is designed as a "normally-closed" or "normally-open" valve, respectively. Some microfluidic systems can already be designed to make use of a blister pack with blisters that contain various fluids, such as reactants for use in the microfluidic system. These systems often already include a mechanism for pressing blisters, such as a robotically-controlled piston. It can be relatively simple to add a microfluidic valve as described herein, because actuating the valve can be performed by pressing a blister similar to the other blisters already present in the system.

A microfluidic valve as described herein includes a substrate with a microfluidic channel formed in the substrate. A sealing layer is positioned over the microfluidic channel, A flexible blister layer is positioned over the sealing layer. The flexible blister layer includes a blister that has the form of a distended, bulging portion of the flexible blister layer. This leaves a space between the bulging flexible blister layer and the sealing layer, which space is referred to as a "blister volume," The microfluidic valve can be actuated by pressing the blister, which can puncture the sealing layer beneath the blister. Depending on whether the microfluidic valve is a normally-open valve or a normally-closed valve, pressing the blister can cause the valve to either block fluid flow through the microfluidic channel, or to allow fluid flow through the microfluidic channel, respectively.

In a normally-open microfluidic valve, the blister can be filled with a non-newtonian plugging fluid. In some examples, the non-newtonian plugging fluid can be a viscous fluid, such as a grease. When the blister is pressed, the sealing layer can be punctured and the non-newtonian plugging fluid can be injected into the microfluidic channel. This can form a plug of the non-newtonian plugging fluid, which blocks the microfluidic channel so that no other fluids (i.e., liquids, air, or other gases) can flow through the microfluidic channel. This type of microfluidic valve is referred to as "normally-open" because the microfluidic channel is open and unobstructed before the blister is pressed, and then after the blister is pressed the microfluidic channel is closed off by the plug of non-newtonian plugging fluid.

The non-newtonian plugging fluid can be any fluid that has a sufficiently high viscosity, after being injected into the microfluidic channel, to block fluid flow through the microfluidic channel. This fluid is referred to as "non-newtonian" because the fluid may have a non-constant viscosity. For example, the fluid can be shear-thinning fluid, Bingham plastic fluid, viscoplastic fluid, or curable fluid. In some examples, the non-newtonian plugging fluid can have a relatively lower viscosity when pressure is applied to the blister and the non-newtonian plugging fluid is injected into the microfluidic channel. Then, after the non-newtonian plugging fluid has been injected and has come to rest, the viscosity can be higher so that the non-newtonian plugging fluid can block fluid flow through the microfluidic channel. When the blister is pressed to inject the non-newtonian plugging fluid into the microfluidic channel, the force applied to the blister can be from 10 Newtons (kg·m·s$^{-2}$) to 40 Newtons (kg·m·s$^{-2}$), or from 10 Newtons (kg·m·s$^{-2}$) to 20 Newtons (kg·m·s$^{-2}$), or from 20 Newtons (kg·m·s$^{-2}$) to 40 Newtons (kg·m·s$^{-2}$).

Figure 1B:
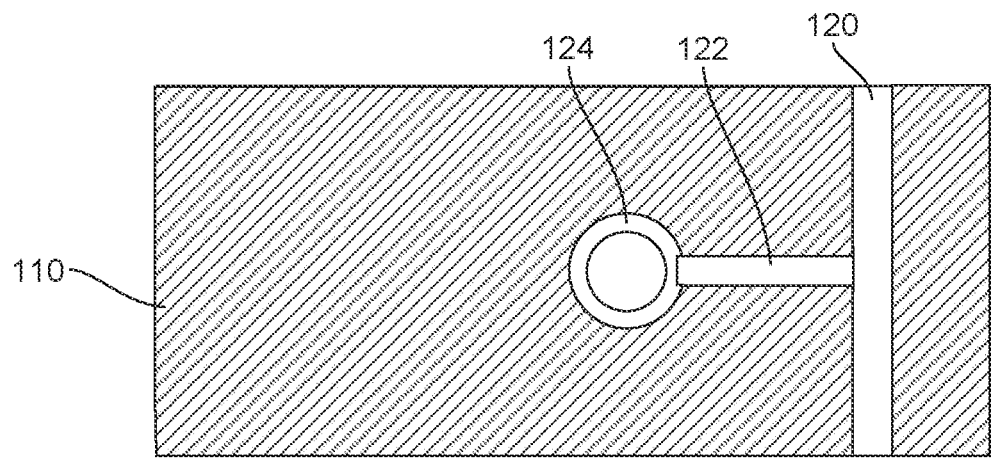
FIG. 1B is a top-down view of a substrate of an example microfluidic valve in accordance with the present disclosure.

FIG. 1A shows a side cross-sectional view of one example of a normally-open microfluidic valve 100. This microfluidic valve includes a substrate 110 with a microfluidic channel 120 formed in the substrate. This example also includes an injection channel 122 and an opening well 124 formed in the substrate. FIG. 1B shows a top-down view of the substrate alone to illustrate the layout of the microfluidic channel, injection channel, and opening well. In this example, the opening well has a greater depth and width compared to the injection channel and the microfluidic channel. Returning to FIG. 1A, a sealing layer 130 is positioned over the substrate. The sealing layer in this example covers the opening well, injection channel, and microfluidic channel. Thus, the sealing layer forms the ceiling of the microfluidic channel. A flexible blister layer 140 is positioned over the sealing layer. The flexible blister layer includes a blister 150 that is a distended portion of the flexible blister layer that bulges upward. In this particular example, the blister includes both an opening blister 152 and an injection blister 154. The opening blister includes a puncturing point 156 that points downward toward the sealing layer. When the opening blister is pressed, the puncturing point can puncture the sealing layer. A non-newtonian plugging fluid 160 is contained inside the blister. Most of the non-newtonian plugging fluid is inside the injection blister portion of the blister. FIG. 10 shows a top-down view of the blister layer to illustrate the shape of the opening blister and the injection blister. The opening blister has a shape similar to a donut or a volcano, with the puncturing point forming a depression in the center of the opening blister. The injection blister is formed as a simple hemispherical shape.

Figure 1C:
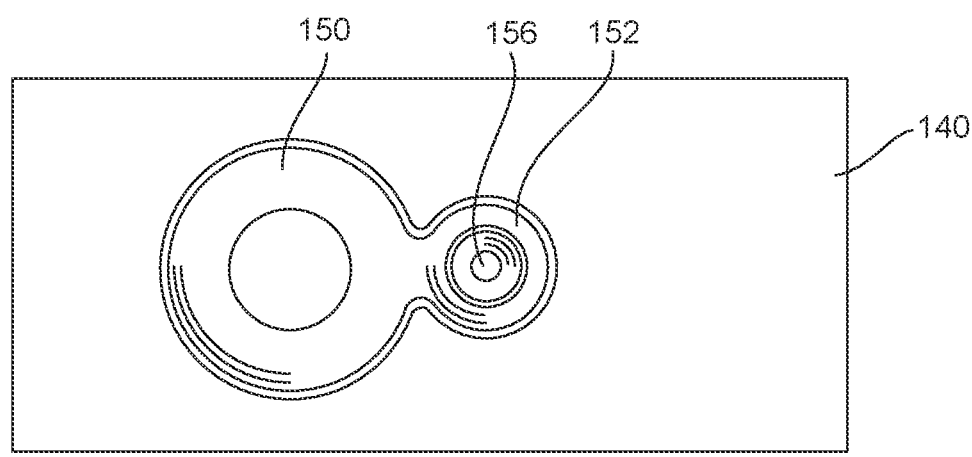
FIG. 1C is a top-down view of a flexible blister layer of an example microfluidic valve in accordance with the present disclosure.
Figure 2A:
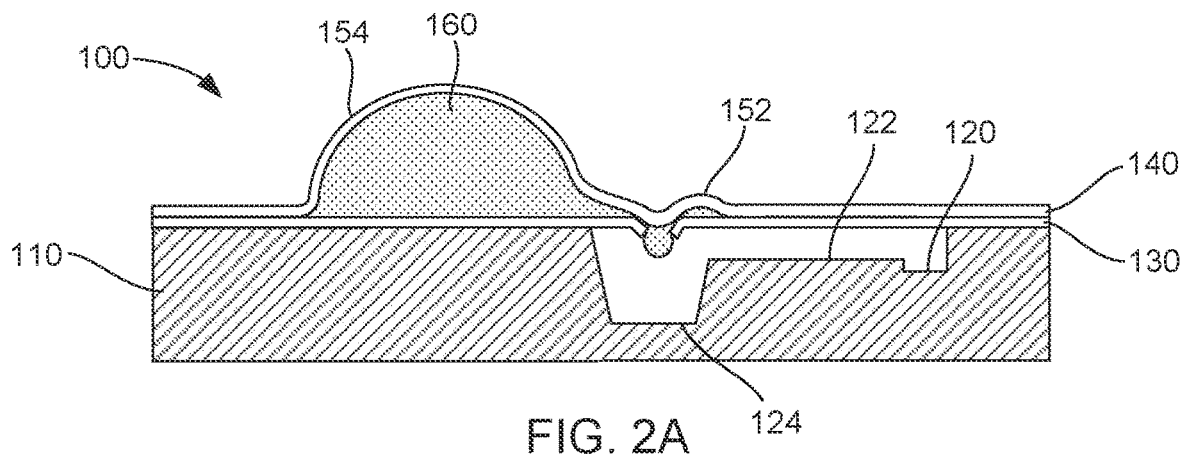
FIGS. 2A-2C illustrate a process of closing an example normally-open microfluidic valve in accordance with the present disclosure.
Figure 2B:
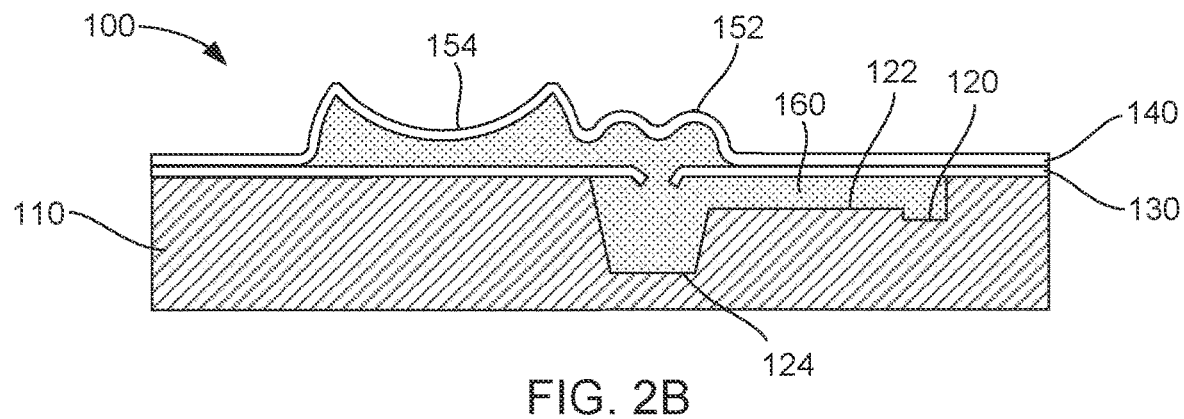
Figure 2C:
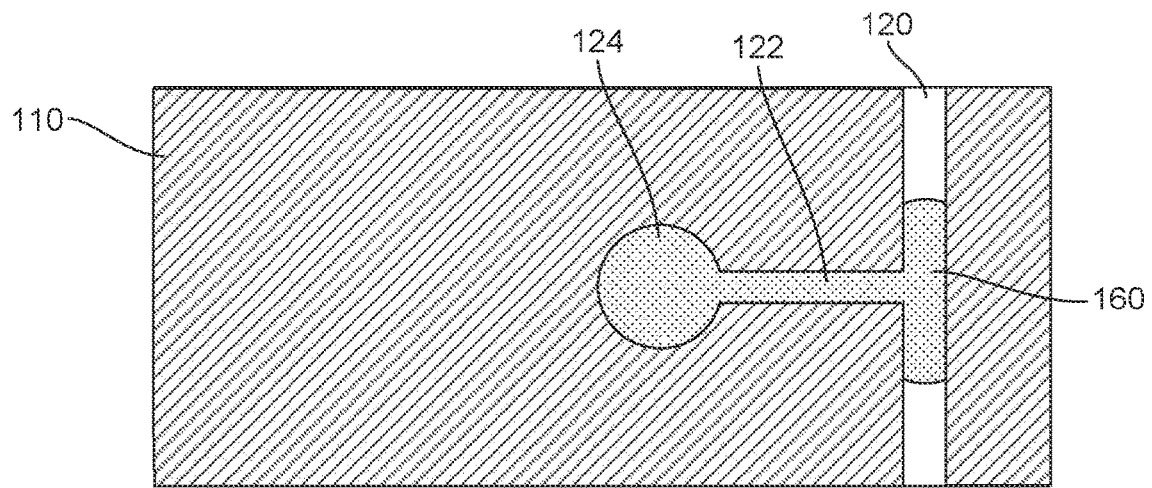

FIGS. 2A-20 illustrate a process of actuating an example microfluidic valve 100. This example microfluidic valve has the same design as shown in FIGS. 1A-1C. In FIG. 2A, the opening blister 152 is pressed to puncture the sealing layer 130. After the opening blister has been pressed and the sealing layer has been punctured, the injection blister 154 can be pressed to squeeze the non-newtonian plugging fluid 160 out of the blister into the opening well 124. The non-newtonian plugging can then proceed through the injection channel 122 and into the microfluidic channel 120 to block of the microfluidic channel. FIG. 2B shows the injection blister after being pressed. The injection blister is deformed and collapsed, and the non-newtonian plugging fluid has been injected into the microfluidic channel. FIG. 2C shows a top-down view of the substrate 110 to show how the non-newtonian plugging fluid flows into the microfluidic channel and forms a plug in the microfluidic channel. This plug prevents fluid from flowing through the microfluidic channel.

The non-newtonian plugging fluid can be a fluid having sufficient viscosity to block fluid flow through a microfluidic channel. In various examples, the viscosity level that is sufficient can vary depending on the conditions of fluids in a particular microfluidic device. In certain examples, fluid in a microfluidic device may be under pressure do the force of gravity on a pressure head of fluid upstream of the plug of non-newtonian plugging fluid. The non-newtonian plugging fluid can have a sufficient viscosity to hold the plug in place, against the pressure head. In other examples, the fluid in the microfluidic channel may be under pressure exerted in some other way. Additionally, the diameter of the microfluidic channel can affect the level of viscosity that is sufficient. A smaller microfluidic channel can allow a less-viscous plugging fluid to support a given pressure. In some examples, the microfluidic channel can have a diameter or width from 50 μm to 3 mm, or from 100 μm to 1 mm, or from 200 μm to 1 mm. The fluid upstream of the non-newtonian fluid plug can exert a pressure of up to 8 inches of water, or up to 12 inches of water, or up to 16 inches of water. The non-newtonian plugging fluid can have a holding pressure from 1,000 Pa to 5,000 Pa when the non-newtonian plugging fluid is injected into the microfluidic channel. The level of viscosity that is sufficient to block the microfluidic channel can be 5,000 centipoise or greater in some examples. In other examples, the sufficient viscosity can be 10,000 centipoise or greater, or 15,000 centipoise or greater, or 20,000 centipoise or greater. Viscosity is often referred to more specifically as dynamic viscosity, and can be measured using a viscometer such as viscometers available from AMETEK, Inc. (USA), Anton Paar GmbH (Austria), or IKA (Germany). Some non-newtonian fluids can act as if they have an infinite viscosity when the amount of shear stress applied to the fluid is below a certain threshold, Thus, in some examples the non-newtonian fluid plug can effectively have an infinite viscosity when the non-newtonian fluid is at rest in the microfluidic channel.

In certain examples, the non-newtonian plugging fluid can be a Bingham plastic, a viscoplastic, a shear thinning fluid, or a curable fluid. Bingham plastics can include materials that behave as rigid bodies at low stress but which flow as a viscous fluid at high stress. The transition between the rigid body behavior and the viscous fluid behavior can occur at various different stress levels, depending on the particular Bingham plastic material. Bingham plastics can include greases, slurries, suspensions of pigments, and others.

Viscoplastics are a broader category of materials that can include Bingham plastics. Viscoplastic materials can experience irreversible plastic deformation when stress over a certain level is applied. When stress under this level is applied, the viscoplastic material can behave as a rigid body, as is the case with Bingham plastics, or the viscoplastic material can undergo reversible elastic deformation.

Shear thinning fluids are materials that behave as a fluid with a high viscosity when low stress is applied, but the viscosity of the fluid decreases when the stress is increased.

Examples of shear thinning fluids can include polymer solutions, molten polymers, suspensions, colloids, and others.

In certain examples, the non-newtonian plugging fluid can include a mineral oil-based grease, a vegetable oil-based grease, a petroleum oil-based grease, a synthetic oil-based grease, a semi-synthetic oil-based grease, a silicone oil-based grease, or a combination thereof. Regarding the viscosity of greases, because of the strong shear thinning behavior of many greases, an additional measurement of the consistency can be useful besides normal dynamic viscosity. Consistency of grease can be expressed as an NLGI (National Lubricating Grease Institute) consistency number. This number can be measured using the standard classification and specification of lubricating grease, which is reproduced in ASTM D4950. The NLGI consistency number can be one of nine grades, included grade 000, grade 00, grade 0, grade 1, grade 2, grade 3, grade 4, grade 5, and grade 6. The grades progress from softer consistency to harder consistency. In some examples, the non-newtonian plugging fluids described herein can have an NLGI consistency number from 0 to 6. In further examples, the NLGI consistency number can be from 1 to 5, from 2 to 5, from 1 to 4, or from 2 to 4.

In certain examples, the non-newtonian plugging fluid can be grease-based. As used herein, "grease" can refer to a dispersion of a thickening agent in a liquid lubricant. Some greases can include a soap emulsified with a base oil, such as a mineral oil, vegetable oil, or petroleum oil. Greases often have a high initial viscosity when at rest, and the viscosity can drop upon application of shear stress. Thus, greases are often used on bearings to give the effect of an oil-lubricated bearing when the bearing is in motion, where the grease has approximately the viscosity of the base oil when the bearing is in motion. Accordingly, greases can often act as a solid when not under stress or when low stress is applied. However, greases can flow as a viscous fluid when higher stresses are applied. This can allow the grease to be injected into the microfluidic channel to form a plug, and then the plug can act as a solid when under low stress. Examples of greases that can be used can include greases available under the trade names ANTI-SEIZE TECHNOLOGY™ (A.S.T. Industries, Inc., USA), CITGO® (Citgo Petroleum Corporation, USA), JET-LUBE® (Whitmore Manufacturing LLC, USA), KRYTOX™ (Chemours Company, USA), MOBIL® (Exxon Mobil Corporation, USA), MYSTIK® (Mystik Lubricants, USA), SPRAYON® (Sprayon, USA), and SUPER LUBE® (Super Lube, USA).

Grease-based plugging fluids can also include additives such as PTFE particles, polyurea, calcium stearate, sodium stearate, lithium stearate, clay, graphite, silica, molybdenum disulfide, aluminum, copper, zinc, and others.

Curable fluids can also be used as the non-newtonian plugging fluid. Curable fluids can include fluids that can undergo a curing process to increase the viscosity of the fluid and/or cause a phase change from liquid to solid. Although solids are often not considered to have a viscosity, the non-newtonian plugging fluids described herein can include curable fluids that change from a liquid to a solid when cured, as the solid form will be capable of preventing fluid flow through a microfluidic channel. The curing process can include thermal curing, chemical curing, ultraviolet radiation curing, or other curing methods. In some examples, curable fluids can include monomers that can polymerize to form polymers and/or polymers that can become crosslinked during the curing process. Examples of curable fluids can include two-part epoxy resins, two-part polyurethane resins, ultraviolet curing epoxies, ultraviolet curing acrylates, ultraviolet curing urethanes, ultraviolet curing thiols, and others, Curable fluids can also include gels, cross-linkable polymers, and other materials. In some examples, a curable adhesive such as ultraviolet curable adhesives can be used. Some example ultraviolet curable adhesives can include MASTER BOND® UV adhesives from Master Bond Inc. (USA). In other examples, a two-part curable resin such as a two-part epoxy resin can be used. In these examples, two blisters can hold the two parts of the resin and the two parts can be mixed together when the two parts are injected into the microfluidic channel.

In further examples, the non-newtonian plugging fluid can be insoluble in the fluids that will contact the non-newtonian plugging fluid after being injected into the microfluidic channel. For example, an aqueous fluid may be flowing through the microfluidic channel before the non-newtonian plugging fluid is injected. The non-newtonian plugging fluid can be a non-aqueous fluid such as a grease that will not dissolve in the aqueous fluid. In other examples, the fluids in the microfluidic channel can be non-aqueous fluids and the non-newtonian plugging fluid can be an aqueous fluid such as a hydrogel.

Figure 3:
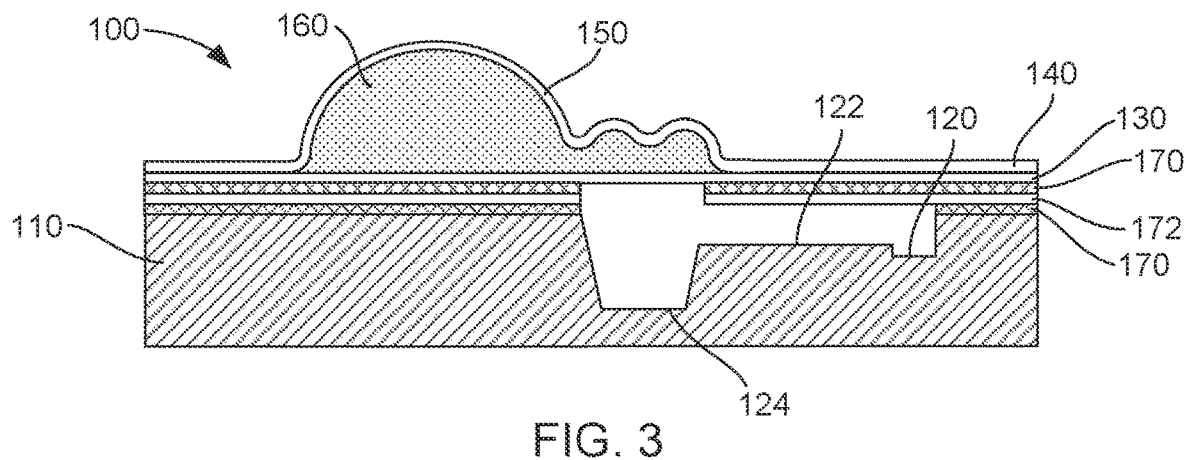
FIG. 3 is a side cross-sectional view of another example microfluidic valve in accordance with the present disclosure.

Microfluidic valves can also include additional components and different designs. FIG. 3 shows an example microfluidic valve 100 that includes multiple additional layers of material. As in the previous examples, this microfluidic valve includes a substrate 110. A pressure-sensitive adhesive layer 170 is adhered to the top surface of the substrate. A label layer 172 is then adhered to the top of the pressure sensitive adhesive layer. Another pressure-sensitive adhesive layer is placed over the label layer, and then the sealing layer 130 and flexible blister layer 140 are added as in the previous examples. The pressure-sensitive adhesive layers can be included to adhere neighboring layers together. The label layer can be a layer of material that is mechanically strong enough to not be punctured when the blister 150 is pressed. The label layer can be made from a thin material such as a plastic film, foil, paper, or similar material. In this example, the label layer has an opening directly over the opening well 124 to allow the sealing layer to be punctured and open over the opening well to inject non-newtonian plugging fluid 160 into the opening well. However, the label layer covers the top of the injection channel 122 and the microfluidic channel 120. Thus, the label layer provides a ceiling for these channels and ensures that the sealing layer does not rupture over these channels or deform downward into the channels, which could cause partial or total blockage of the channels if part of the sealing layer were to clog the channels. Accordingly, the label layer can be designed to have openings at locations where the sealing layer is designed to by punctured, and the label layer can cover other features such as microfluidic channels. A label layer and/or pressure-sensitive adhesive layers can be added to any of the other example microfluidic valves and microfluidic devices described herein.

In some examples, the pressure-sensitive adhesive layers can include double-sided tape, glue, or other pressure-sensitive adhesives. As used herein "pressure-sensitive" refers to adhesives that can adhere to a surface when pressure is applied to stick the adhesive to the surface, without solvents, water, heat, activators, or other components to activate the adhesive. In some examples, pressure-sensitive adhesives can include an elastomer, such as acrylic, acrylate, rubber, silicone rubber, ethylene-vinyl acetate, or other elastomers. Pressure-sensitive adhesives can also include a tackifier, such as a rosin ester. In various examples, the pressure-sensitive adhesive layers can have a thickness from about 0,005 mm to about 1 mm, or from about 0,005 mm to about 0.5 mm, or from about 0,005 mm to about 0.1 mm.

Figure 4:
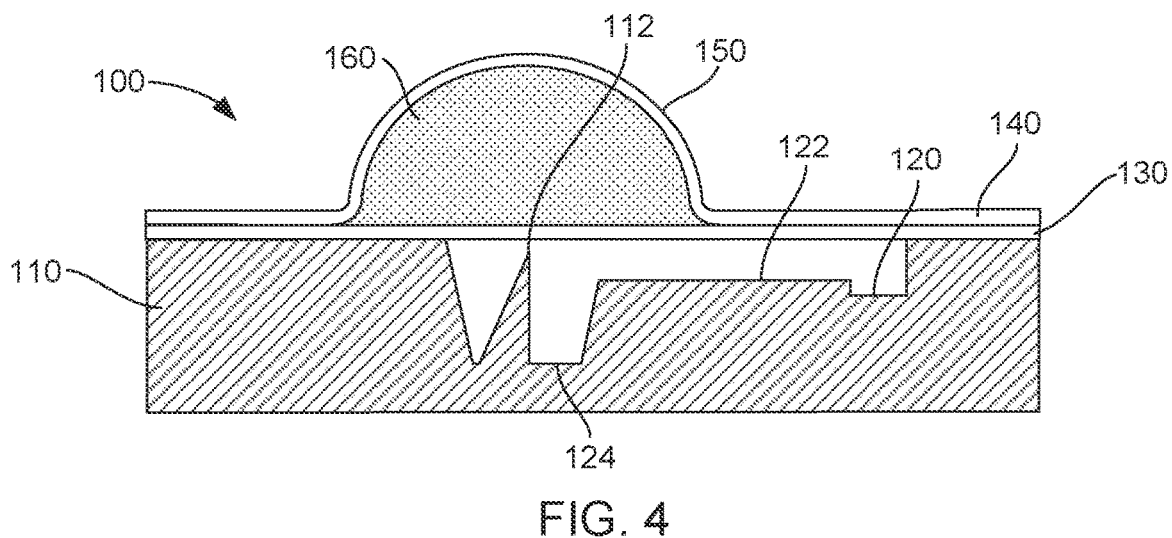
FIG. 4 is a side cross-sectional view of another example microfluidic valve in accordance with the present disclosure.

FIG. 4 shows another example microfluidic valve 100. This example does not include an opening blister with a puncturing point as in the previous examples. Instead, this example includes a single blister 150 filled with non-newtonian plugging fluid 160. The substrate 110 includes a puncturing point 112 formed as a sharp pointed protrusion from the opening well 124. When the blister is pressed, the sealing layer 130 flexes downward until the sealing layer is punctured by this puncturing point. The non-newtonian plugging fluid can then flow out of the blister and into the opening well. This example also includes a microfluidic channel 120, injection channel 122, sealing layer 130, and flexible blister layer 140 as in the previous examples.

Figure 5:
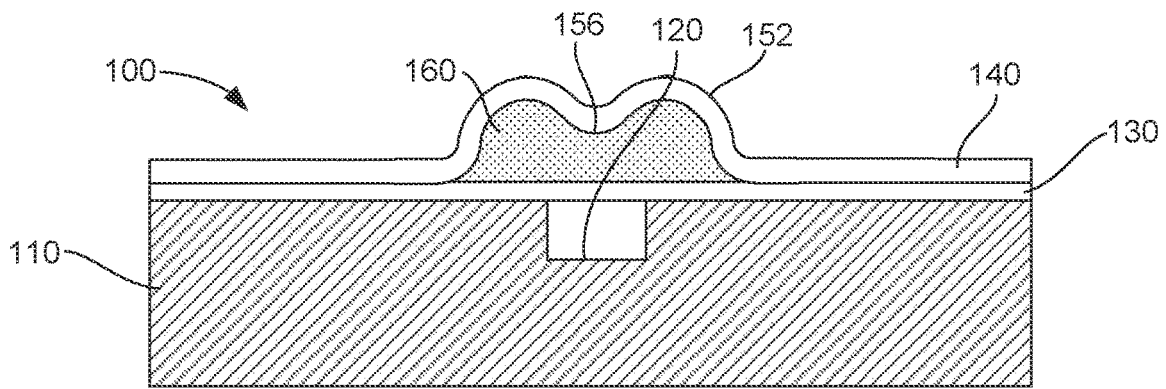
FIG. 5 is a side cross-sectional view of another example microfluidic valve in accordance with the present disclosure.

FIG. 5 shows an example microfluidic valve 100 having a different design. This example does not include an opening well or an injection channel. Instead, an opening blister 152 is positioned directly over the microfluidic channel 120. A cross-section of the microfluidic channel is shown in this figure. The opening blister includes a puncturing point 156 that can puncture the sealing layer 130 when the opening blister is pressed. Additionally, this microfluidic valve includes an opening blister without an additional injection blister as in the previous examples. The opening blister is made with a sufficient blister volume to hold enough non-newtonian plugging fluid 160 to plug the microfluidic channel. The opening blister is formed in the flexible blister layer 140. This microfluidic valve can be actuated with a single press of the opening blister, which both punctures the sealing layer and injects the non-newtonian plugging fluid into the microfluidic channel.

A variety of additional designs can be used for normally-open microfluidic valves. For example, a normally-open microfluidic valve can be positioned on a microfluidic channel that leads to a vent opening. The vent opening can be sealed by actuating the microfluidic valve. In other examples, the microfluidic channel can include multiple branching channel segments. The microfluidic valve can inject non-newtonian plugging fluid into one of the segments to prevent fluid from flowing through that particular segment. Alternatively, the microfluidic valve can be designed to inject the non-newtonian plugging fluid into multiple channel segments or all of the channel segments. The normally open microfluidic valve can also be used to close off a reservoir in order to stop fluid flow out of the reservoir. Some microfluidic processes can include hazardous materials in fluids flowing through microfluidic channels. In such cases, microfluidic valves can be used to block exits from the microfluidic device to contain hazardous materials within the device before the device is disposed of. In some cases, the microfluidic valve may be used to intentionally foul a microfluidic device by injecting non-newtonian fluid into microfluidic channels to prevent the device from being re-used.

The examples described above are examples of normally-open valves that can be closed by pressing a blister. As mentioned above, the microfluidic devices described herein can also include normally-closed valves that can be opened by pressing a blister. In normally-closed valves, the sealing layer of the microfluidic valve can initially provide a hermetic seal prevent fluid from flowing through the valve. The sealing layer can then be punctured and the puncture hole can allow fluid to flow through the valve. In more detail, a normally-closed valve can include two microfluidic channel segments. These can be referred to as a first microfluidic channel and a second microfluidic channel. The first and second microfluidic channels are formed in the substrate, but are not in fluid communication one with another, A blister is formed overlapping a portion of both of the microfluidic channels. As explained above, the blister includes a blister volume inside the blister, between the flexible blister layer and the sealing layer. The first microfluidic channel is separated from the blister volume by an intact sealing layer. However, an opening is pre-formed in the sealing layer connecting the second microfluidic channel to the blister volume. Thus, the second microfluidic channel is initially in fluid communication with the blister volume. However, because the sealing layer is intact over the first microfluidic channel, no fluid can flow between the first and second microfluidic channels through the blister. When the blister is pressed, the sealing layer is punctured over the first microfluidic channel, placing the first microfluidic channel into fluid communication with the blister volume and the second microfluidic channel.

Figure 6A:
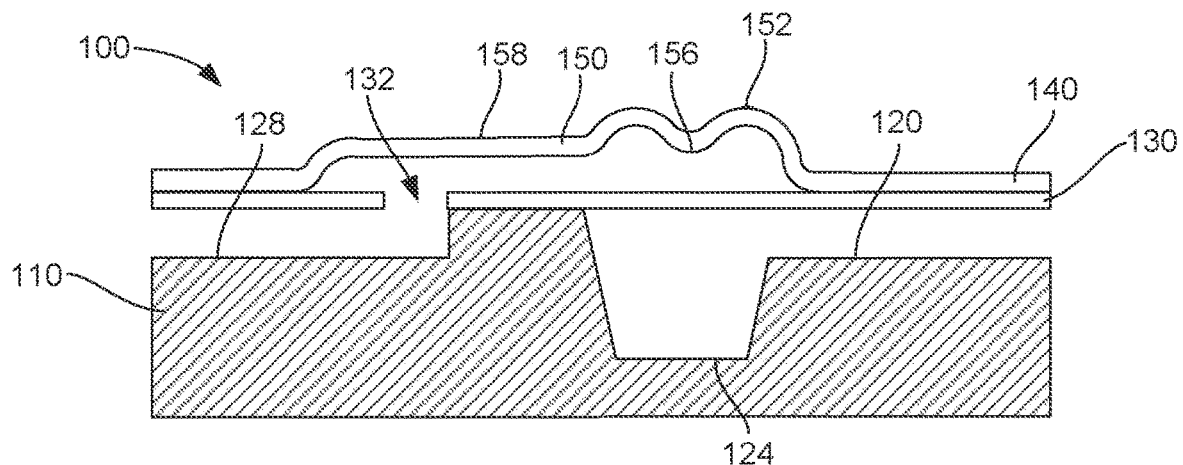

FIG. 6A shows a side cross-sectional view of an example normally-close microfluidic valve 100. This microfluidic valve includes a substrate 110, a sealing layer 130 over the substrate, and a flexible blister layer 140 over the sealing layer. The substrate includes a first microfluidic channel 120, a second microfluidic channel 128, and an opening well 124 connected to the first microfluidic channel. A blister 150 is formed in the flexible blister layer. This blister includes an opening blister 152 and a connecting blister segment 158. The opening blister includes a puncturing point 156 oriented downward toward the sealing layer. The connecting blister segment extends to a pre-formed opening 132 in the sealing layer. The pre-formed opening connects to the second microfluidic channel, so that the second microfluidic channel is in fluid communication with the blister volume inside the blister.

Figure 6B:
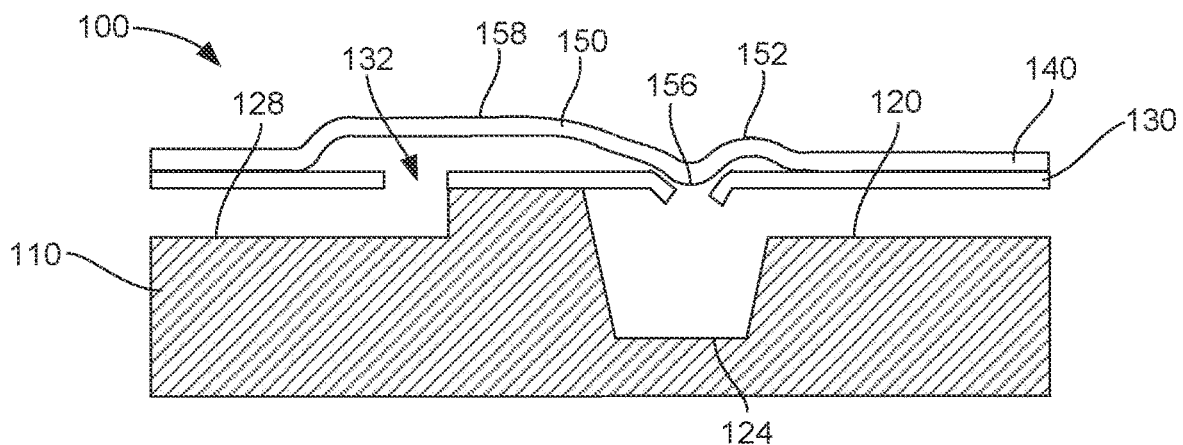
Figure 6C:
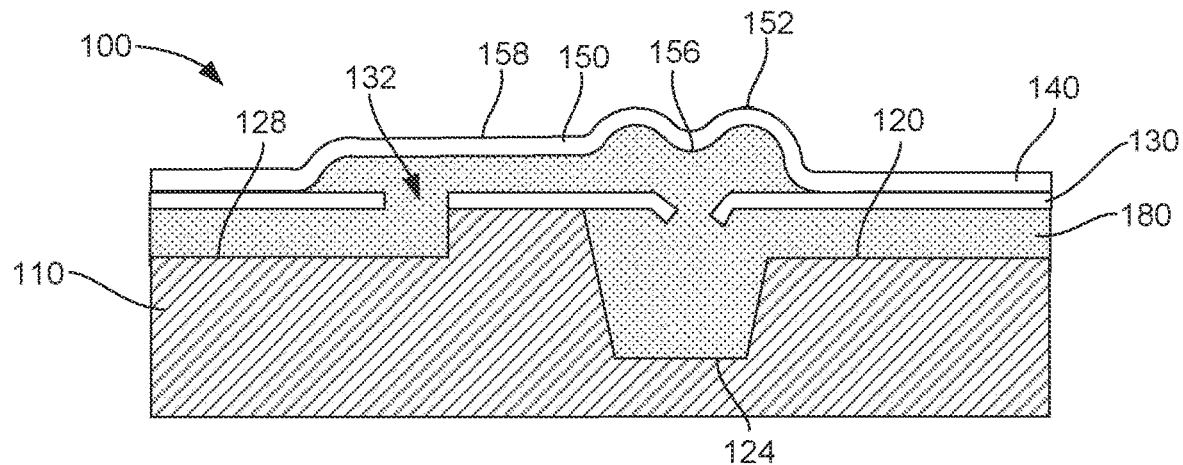

FIG. 6B shows the normally-closed microfluidic valve 100 as the opening blister 152 is being pressed. The puncturing point 156 punctures the sealing layer above the opening well 124. This places the opening well and the first microfluidic channel 120 into fluid communication with the blister 150 and the second microfluidic channel 128. When the pressing force is removed from the opening blister, the opening blister can rebound somewhat and leave a clear passageway through the punctured hole in the sealing layer. Fluid can then flow freely from the second microfluidic channel to the first microfluidic channel or vice versa. FIG. 6C shows the microfluidic valve after liquid 180 has flowed through the second microfluidic channel, into the blister volume, and then into the first microfluidic channel 120.

Figure 6D:
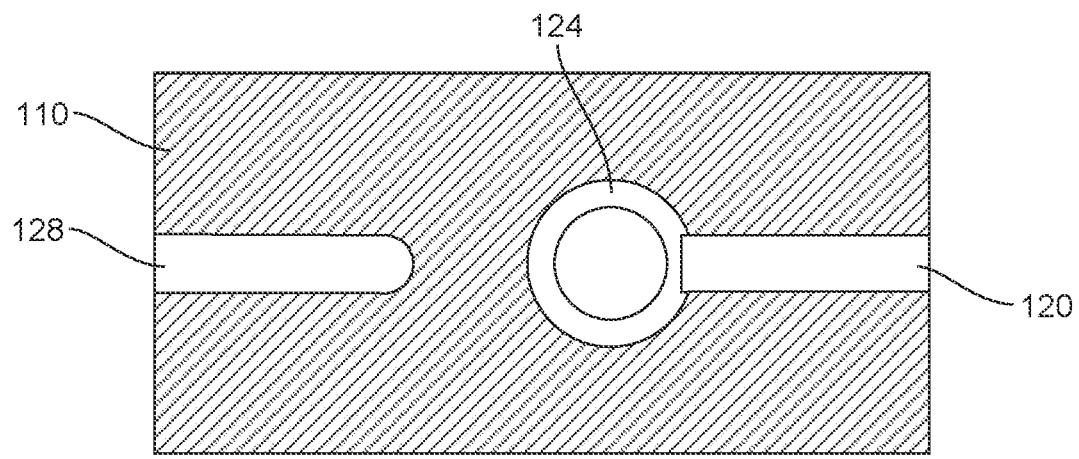
FIG. 6D is a top-down view of a substrate of an example microfluidic valve in accordance with the present disclosure.
Figure 6E:
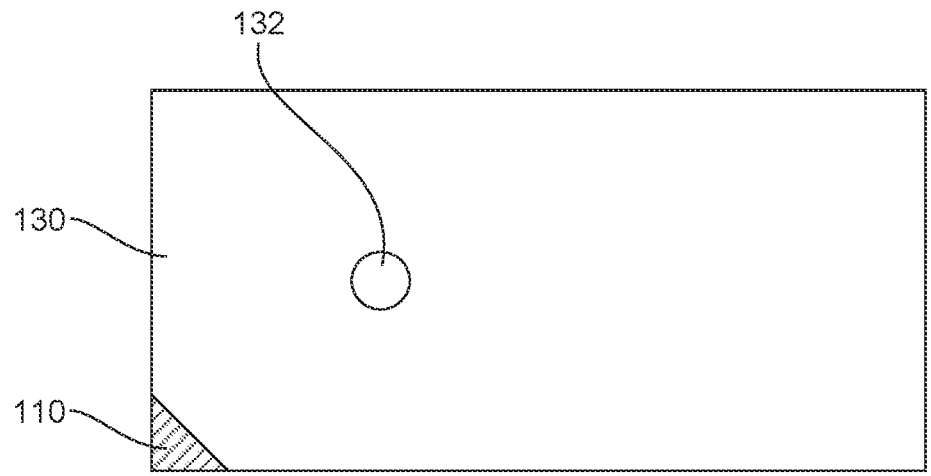
FIG. 6E is a top-down view of a sealing layer of an example microfluidic valve in accordance with the present disclosure.
Figure 6F:
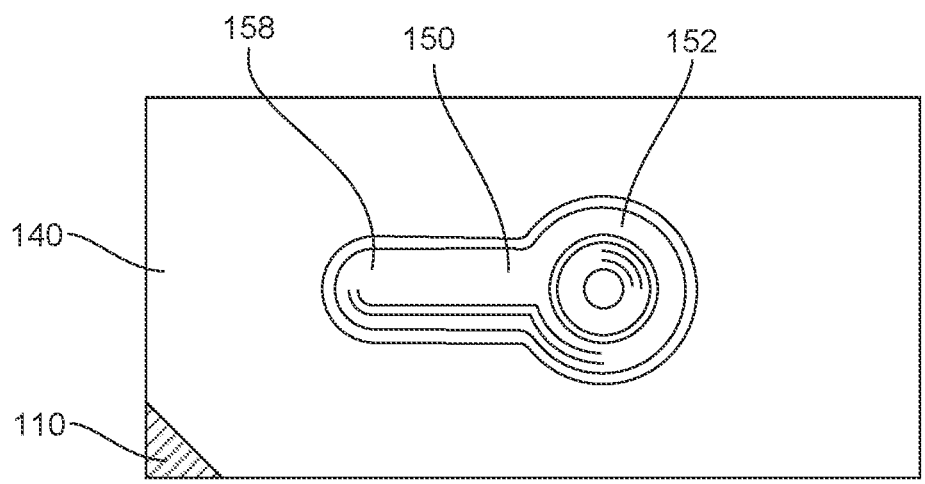
FIG. 6F is a top-down view of a flexible blister layer of an example microfluidic valve in accordance with the present disclosure.

FIG. 6D shows a top-down view of the substrate 110 of the microfluidic valve to illustrate the layout of the first microfluidic channel 120, opening well 124, and second microfluidic channel 128. FIG. 6E shows the sealing layer 130 positioned over the substrate. The sealing layer has a pre-formed opening 132 over the second microfluidic channel. FIG. 6F shows the flexible blister layer 140 positioned over the sealing layer. This figure shows the shape of the blister 150, which includes an opening blister 152 positioned over the opening well and a connecting blister segment 158 that extends to the pre-formed opening in the sealing layer. The blister may have a variety of other shapes, so long as the blister volume is able to connect the first microfluidic channel to the second microfluidic channel when the blister is actuated.

Normally-closed microfluidic valves can also include a variety of additional components and different designs. The normally-closed microfluidic valves can include additional layers of material, such as pressure sensitive adhesive layers and label layers as described above. In some examples, normally-closed microfluidic valves can include an opening blister with a puncturing point that breaks the sealing layer from above. In other examples, a puncturing point can be formed on the substrate as a sharp protrusion that can break the sealing layer from below when the blister is pressed. The microfluidic valves can also be designed with or without opening wells, as described above.

Regarding the substrate of the microfluidic valves described herein, the substrate can be a solid material having a microfluidic channel or microfluidic channels formed therein. The solid material can include various polymers (e.g. Polypropylene, TYGON, PTFE, COO, SU-8 photoresist, PDMS, or others), glass (e.g. borosilicate), metal (e.g. stainless steel), or a combination of materials. The microfluidic channels and other features can be formed in the substrate by a variety of processes, including molding, machining, etching, 3-D printing, photolithography, laser cutting, and so on. In some examples, the microfluidic channels can be formed as trenches that are open on a top surface of the substrate. The ceiling of these microfluidic channels can be formed by a label layer or by sealing layer or some other material layer that can be positioned over the top surface of the substrate. In other examples, the microfluidic channels can be formed beneath the surface of the substrate, so that the microfluidic channels have a ceiling made of the substrate material. The substrate can be monolithic or may be a combination of multiple components fitted together. Thus, the substrate can be modular in some examples.

Microfluidic Devices

The present disclosure also describes microfluidic devices that can include the microfluidic valves described above. A microfluidic device can include a substrate with a fluid flow microfluidic channel formed in the substrate. A microfluidic valve can be positioned in fluid communication with the fluid flow microfluidic channel. Initially, the microfluidic valve can either allow fluid flow or block fluid flow through the fluid flow microfluidic channel. The microfluidic valve includes a sealing layer over the fluid flow microfluidic channel and a flexible blister layer over the sealing layer. The flexible blister layer includes a blister that is formed as a distended portion with a blister volume between the flexible blister layer and the sealing layer. The microfluidic valve is actuatable by puncturing the sealing layer by pressing on the blister. As explained above, microfluidic valves can be designed as normally-open valves or normally-closed valves. When a normally-open valve is actuated, the valve switches to closed so that the fluid flow is blocked. When a normally-closed valve is actuated, the valve switches to open so that the fluid flow is allowed.

A wide variety of applications can be found for normally-open valves and normally-closed valves in microfluidic devices. The microfluidic devices described herein can include such valves used in any way. In some examples, a normally-closed valve can retain a fluid inside a reservoir and then the valve can be opened to allow fluid to flow out of the reservoir. In other examples, a normally-closed valve can block an air vent. Air pressure within the system may prevent a fluid from flowing through a microfluidic channel until the air vent is opened. Thus, opening the valve can allow air to escape and this can allow fluid to flow through the microfluidic channel. Normally-open valves can also be used in a variety of ways. A normally-open valve can be actuated to shut off a reservoir, or to block an air vent at a desired time. Many other microfluidic device designs can also utilize these microfluidic valves.

In certain examples, a microfluidic device can include a combination of a normally-open valve and a normally-closed valve. In particular examples, these valves can be used to change the direction of fluid flow through a microfluidic channel. A normally open valve can initially allow fluid to flow in a first direction. The normally-open valve can then be actuated to block the fluid flow and stop the flow of the fluid. The normally-closed valve can then be actuated to open up a new pathway for the fluid, and the fluid can flow through the new pathway.

Microfluidic devices can often include additional blisters besides the blisters that are a part of a microfluidic valve. Additionally blisters can contain fluids such as air, other gases, liquids, solvents, reactants, and so on. For example, a blister can contain a liquid that is to be used in the microfluidic device. The blister can be pressed at an appropriate time to inject the liquid into the microfluidic device, such as by injecting the liquid into a particular microfluidic channel. The flow of this liquid can be controlled using the microfluidic valves described herein. In further examples, a blister filled with air can be included. Air pressure can be used to move liquids through microfluidic channels. Thus, an air blister can be pressed to inject air into a microfluidic channel and to push liquid through the microfluidic channel.

A microfluidic device can be designed to precisely meter a specific volume of fluid. This can be useful in processes where it is desired to use a known volume of fluid, such as chemical reactions that may depend on the volume of fluid. As mentioned above, fluids for use in the microfluidic device can be contained in blisters and the fluid can be introduced into the microfluidic device by pressing the blister. However, bursting a blister to inject fluid into the microfluidic device can be a somewhat imprecise process, and the volume of fluid that is injected may vary depending on the way the blister deforms when pressed. Accordingly, it can be useful to design the microfluidic device to meter a more precise volume of fluid. In certain examples, the microfluidic device can include a fluid flow microfluidic channel into which the fluid is introduced from a reservoir blister. As the fluid is introduced into the fluid flow microfluidic channel, the fluid can flow towards a branch point in the channel. The microfluidic device can also include a fluid outlet valve at an opposite end of the fluid flow microfluidic channel from the branch: however, the fluid outlet valve can be close initially so that the fluid flows to the branch point. The branches at the branch point can include an overflow branch and a bypass branch. The bypass branch can lead to a normally-closed microfluidic valve, while the overflow branch can lead to a normally-open valve that is connected to an air vent. The air vent can allow the fluid to flow into the overflow branch, while the static air pressure present in the bypass branch prevents the fluid from flowing into the bypass branch. After the reservoir blister has been pressed, an unknown amount of the fluid has flowed down the overflow branch. At this point, the normally-open valve can be actuated to close the valve, which closes off the air vent. The fluid outlet valve is then opened. The normally-closed valve on the bypass branch can then be actuated to open the valve. This valve can connect to an air blister. The air blister can be pressed to force air through the bypass column. The air can push fluid in the fluid flow microfluidic channel backward towards the fluid outlet. The air pushes the fluid out the fluid outlet while bypassing the fluid that is in the overflow branch. Thus, the volume of fluid that is dispensed from the device is the fluid that was in the portion of the fluid flow microfluidic channel leading up to the branch point. The volume of this portion of the fluid microfluidic channel can be known, so that a known, precise volume of fluid is dispensed from the device.

Figure 7A:
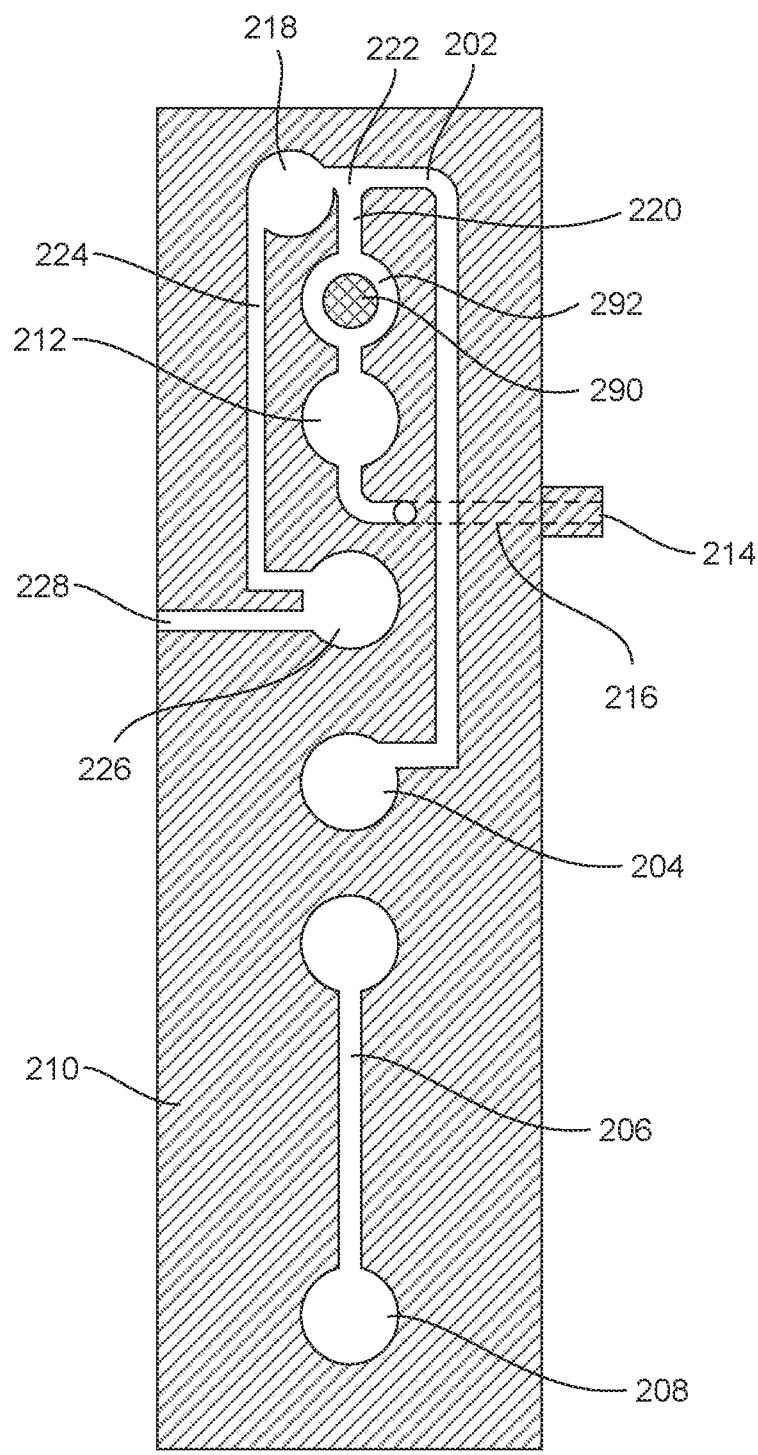
FIGS. 7A-7D illustrate an example microfluidic device in accordance with the present disclosure.

FIGS. 7A-7D illustrate such a microfluidic device 200. FIG. 7A shows a top-down view of the substrate 210 of the device. Multiple microfluidic channels and chambers are formed in the substrate. This particular example also includes a dried reactant pellet 290 held inside a pellet chamber 292. The dried reactant pellet in this example includes dried FOR master mix reactants. The dried FOR master mix reactants can be reconstituted by dissolving the pellet in a reconstitution buffer, and the reconstituted master mix can then be used in a process such as a FOR assay. FOR assays are processes that can rapidly copy millions to billions of copies of a very small DNA or RNA sample. FOR can be used for many different applications, including sequencing genes, diagnosing viruses, identifying cancers, and others. In the FOR process, a small sample of DNA or RNA is combined with master mix reactants that can form copies of the DNA or RNA. The particular example microfluidic device shown in this figure is designed to reconstitute the master mix reactants and then dispense a precisely metered volume of reconstituted master mix fluid for use in a FOR process.

The substrate 210 includes a buffer opening well 212 connected to the pellet chamber 292. A blister filled with reconstitution buffer will be positioned over this buffer opening well, so that when the blister is pressed the reconstitution buffer liquid will flow into the buffer opening well and then into the pellet chamber to dissolve the pellet. The substrate also includes a fluid outlet 214. This outlet is where the metered volume of reconstituted master mix liquid is ultimately dispensed. Although not shown in this figure, the fluid outlet can initially be closed using a valve such as a stopcock or other mechanical valve. Alternatively, a microfluidic valve as described herein can be used to close the fluid outlet. As shown in the figure, the fluid outlet is connected to the buffer opening well by an outlet channel 216. The outlet channel leads deeper beneath the surface of the substrate to pass under the other microfluidic channels on the surface of the substrate. This is shown by the section of the outlet channel that is in dashed lines. Because the fluid outlet is initially closed, when the reconstitution buffer is injected from the reconstitution buffer blister, the buffer does not flow out the outlet channel but instead flows into the pellet chamber. As more of the buffer flows into the devices, excess buffer continues to flow up a fluid flow microfluidic channel 220 to a branch point 222. At the branch point, the buffer flows into an overflow branch 224 that leads to an overflow chamber 218. The overflow branch leads further to a normally-open microfluidic valve. The normally-open microfluidic valve includes a blister filled with a non-newtonian plugging fluid, which is not shown in this figure. The non-newtonian plugging fluid blister is positioned over a non-newtonian plugging fluid opening well 226. This opening well is also connected to an air vent 228. Because this valve is initially open, the air vent allows air to pass out of the device while the reconstitution buffer flows into the overflow branch.

The branch point 222 is also connected to a bypass branch 202. The bypass branch leads to a normally-closed microfluidic valve that includes an opening well 204 under a blister with an intact sealing film (not shown in this figure) to prevent air flow through the valve. The normally-closed microfluidic valve also includes a pre-formed opening in the sealing layer that connects the blister to an air channel 206 that leads to an air blister opening well 208, Because the normally-closed valve is initially closed when the reconstitution buffer is injected into the device, the static air pressure in the bypass branch prevents the reconstitution buffer from flowing into the bypass branch. However, the reconstitution buffer has been injected, the normally-closed valve can be opened, the normally-open valve can be closed and the fluid outlet 214 can be opened. Then, the air blister can be pressed to inject air that forces the reconstitution buffer with dissolved master mix reactants out through the fluid outlet. This process is described in more detail below. Thus, the various channels and chambers in the substrate are designed to reconstitute the dried FOR master mix reactants and then to dispense a metered volume of the reconstituted master mix reactants.

Figure 7B:
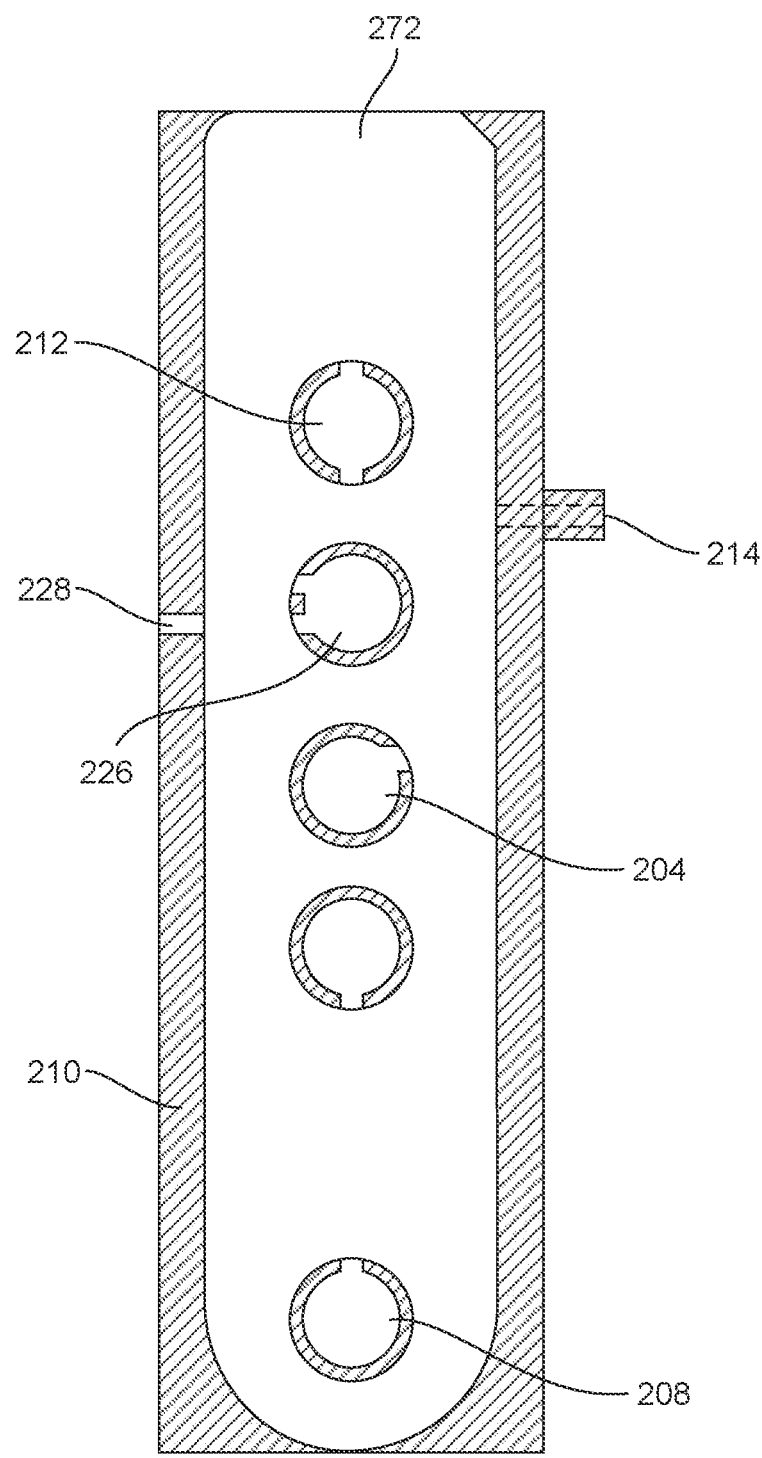

FIG. 7B shows the substrate 210 with a label layer 272 positioned over the substrate. The label layer includes openings where fluids flow from blisters to the substrate and vice versa. Specifically, the label layer includes openings over the reconstitution buffer opening well 212, the non-newtonian fluid opening well 126, the normally-close valve opening well 204, and the air blister opening well 208. An opening is also included in the location of the pre-formed opening in the sealing layer in the normally-closed valve. The label layer forms a ceiling for the various microfluidic channels formed in the surface of the substrate. Although not shown in the figure, a pressure-sensitive adhesive layer may be included to adhere the label layer to the substrate.

Figure 7C:
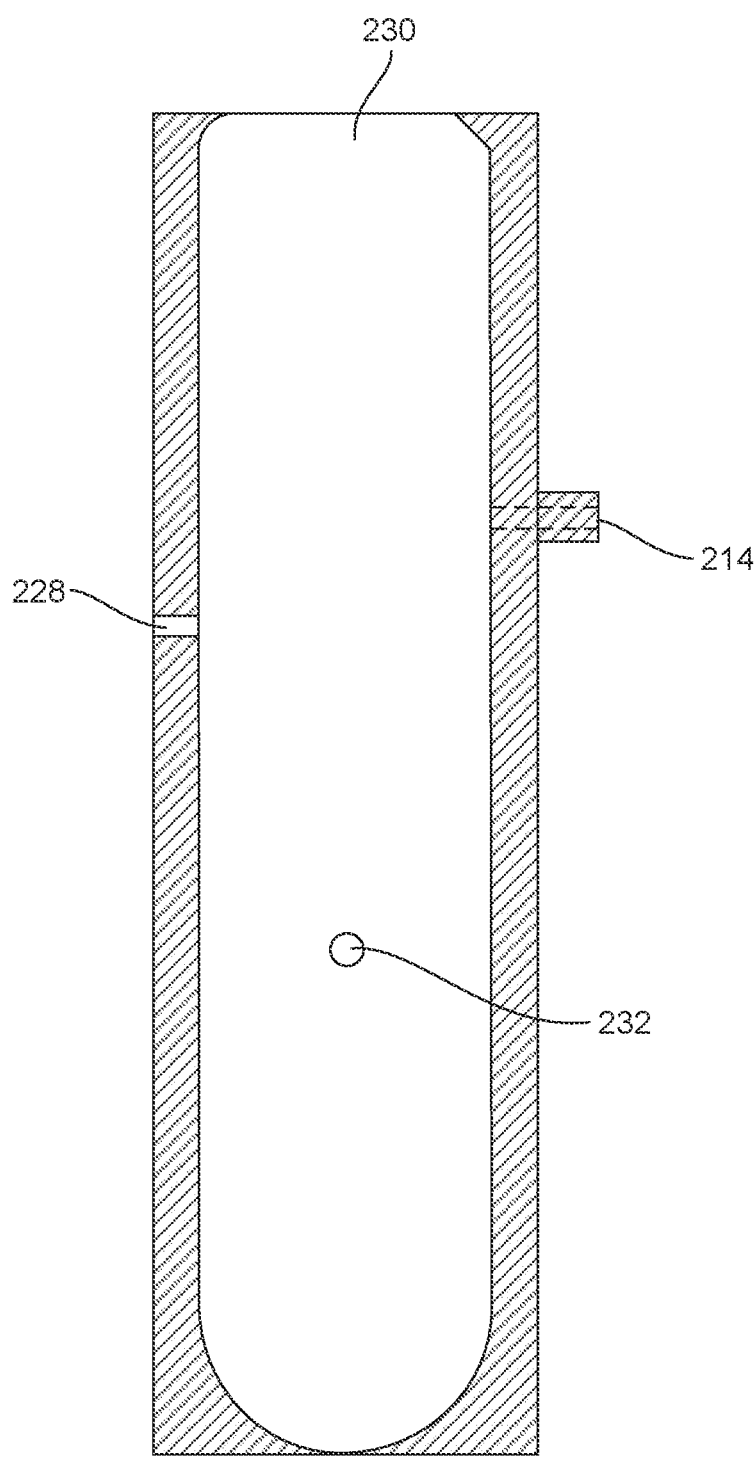

FIG. 7C shows the substrate 210 after the label layer has been applied and then a sealing layer 230 has been applied over the label layer. The sealing layer includes a single opening, which is the pre-formed opening 232 made as a part of the normally-closed valve.

Figure 7D:
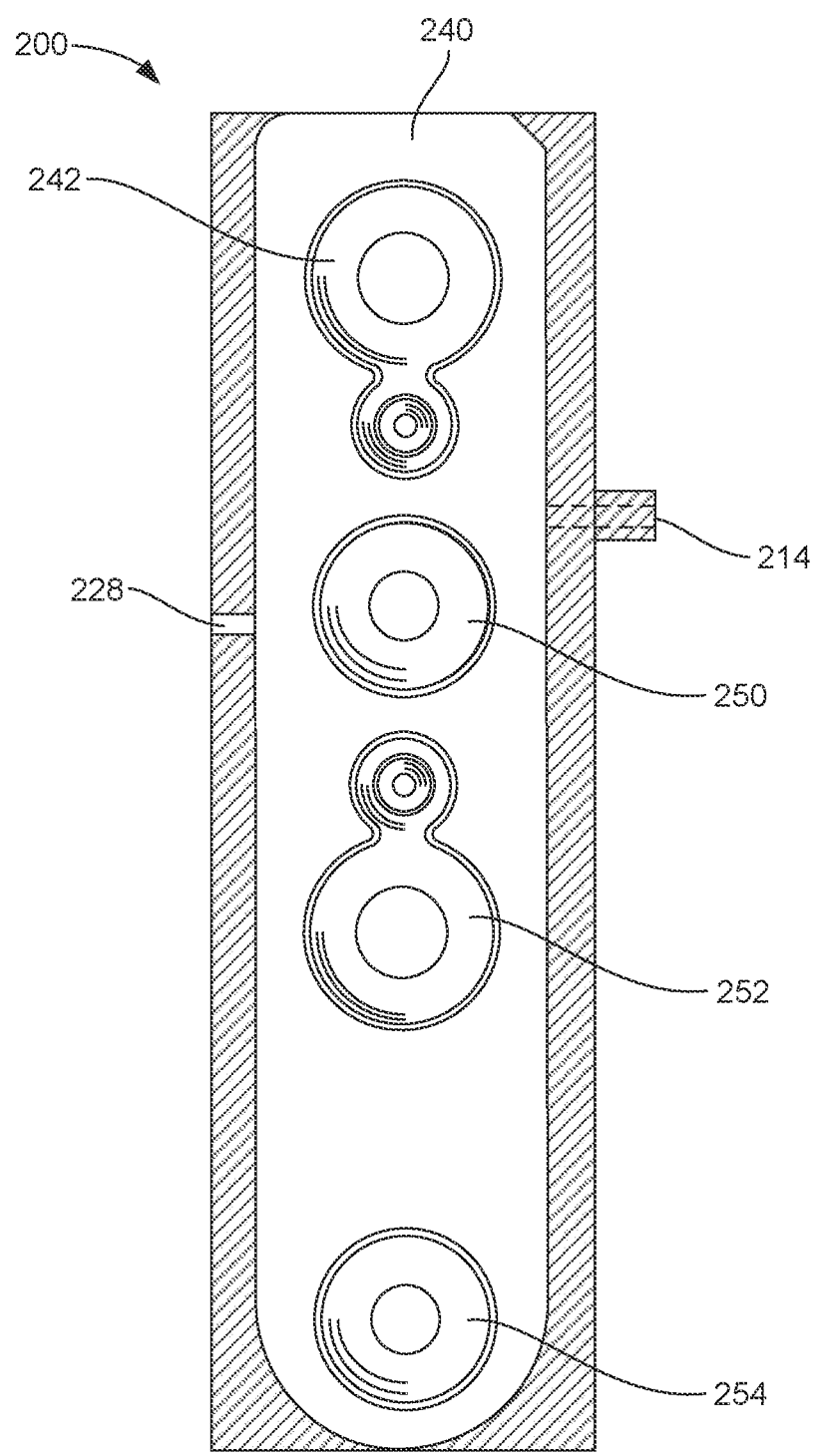

FIG. 7D shows the complete microfluidic device 200 after the flexible blister layer 240 has been applied. The flexible blister layer includes several blisters. First, a reconstitution buffer blister 242 is positioned over the reconstitution buffer opening well. The reconstitution buffer blister includes an opening blister portion with a puncturing point that punctures the sealing layer when pressed. The reconstitution buffer blister also includes a reservoir portion that holds most of the reconstitution buffer. In operation, the opening blister can be pressed first and then the reservoir blister can be pressed second to inject the reconstitution buffer into the reconstitution buffer opening well. A non-newtonian plugging fluid blister 250 is positioned over the non-newtonian plugging fluid opening well. As explained above, this blister can be pressed to inject the non-newtonian plugging fluid and the non-newtonian plugging fluid can block off the air vent 228. The flexible blister layer also includes a normally-closed valve blister 252. This blister includes an opening blister portion that can be pressed to puncture the sealing film. The remainder of the normally-closed valve blister extends to cover the pre-formed opening in the sealing layer that leads to the air channel, Finally, the flexible blister layer also includes an air blister 254 that is filled with air. This blister can be pressed after opening the normally-closed valve to inject air into the bypass branch channel. The air can force the reconstituted FOR master mix reactants out through the fluid outlet 214.

Methods of Directing Fluids

The present disclosure also describes methods of directing fluids. The microfluidic valves described above can be used to direct fluids by blocking the flow of fluid or allowing the flow of fluid. In some examples, methods of directing fluids can utilize a microfluidic device that includes a microfluidic valve or multiple microfluidic valves.

Figure 8:
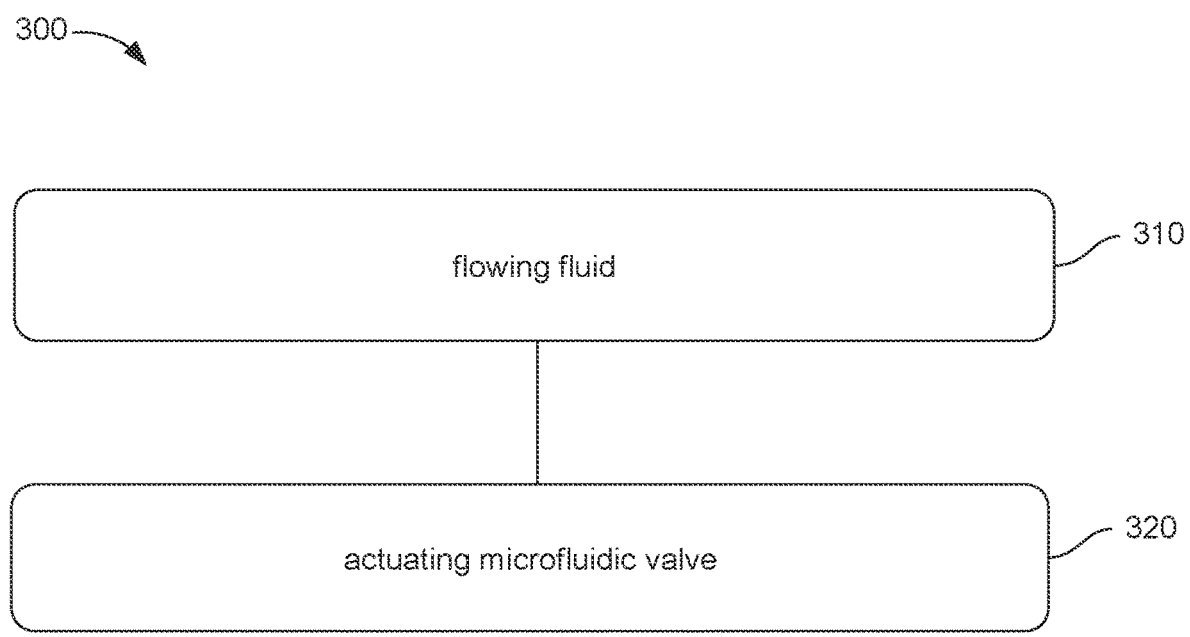
FIG. 8 is a flowchart illustrating an example method of directing fluid flow in accordance with the present disclosure.

FIG. 8 is a flowchart illustrating an example method 300 of directing fluids. This method includes flowing 310a fluid through a fluid flow microfluidic channel having a microfluidic valve positioned in fluid communication with the fluid flow microfluidic channel. The method also includes actuating 320 the microfluidic valve to switch the microfluidic valve from allowing fluid flow to blocking fluid flow or from blocking fluid flow to allowing fluid flow, Flowing the fluid through the fluid flow microfluidic channel may occur before, after, or during the actuating of the microfluidic valve. Thus, the order shown in FIG. 8 is not limiting. For example, if the microfluidic valve is a normally closed valve, then the method can begin without any fluid flow because the microfluidic valve is blocking the fluid flow. The valve can be actuated to switch the valve from blocking fluid flow to allowing fluid flow (i.e., switching from closed to open) and then the fluid can flow after the valve has been opened. In another example, the valve can be a normally-open valve and the method can begin with the fluid flowing through the fluid flow microfluidic channel. The valve can then be closed to stop the flow of the fluid.

Figure 9A:
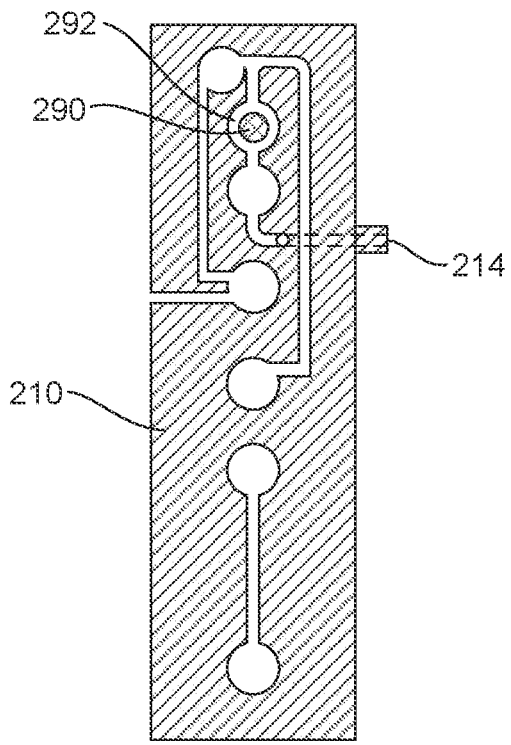
FIGS. 9A-9D illustrate an example method of directing fluid flow in an example microfluidic device in accordance with the present disclosure.

The microfluidic valves used in the methods of directing fluid flow can include any of the components and features of microfluidic valves described above. Multiple microfluidic valves can also be used in combination to direct fluid flow in different ways. As described above, in some examples a combination of a normally-closed valve and a normally-open valve can be used to cause fluid to flow in a first direction through the microfluidic channel, and then the direction of flow can be reversed and the fluid can flow the opposite direction. A more specific example of this was described above in connection with the microfluidic device shown in FIGS. 7A-7D. An example method of directing fluid flow in such a microfluidic devices is shown in more detail in FIGS. 9A-9D. FIG. 9A shows the substrate 210 of the microfluidic device from the earlier example. As explained above, the substrate includes a pellet chamber 292 holding a dried reactant pellet 290. Although not shown in the figure, the fluid outlet 214 is initially closed using an external valve such as a stopcock. The flexible blister layer is not shown in this figure, but the microfluidic device can include several blisters as described above. The blisters can include a reconstitution buffer blister, a non-newtonian fluid blister, an air blister, and a blister for the normally-closed valve.

Figure 9B:
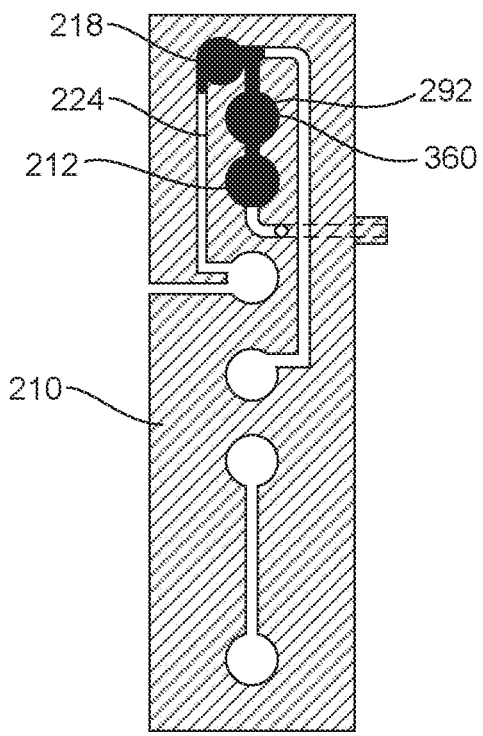

FIG. 9B shows the substrate 210 after the reconstitution buffer blister has been pressed. This injects reconstitution buffer into the reconstitution buffer opening well 212 and the buffer flows up into the pellet chamber 292 to dissolve the dried reactant pellet, making reconstituted reactant fluid 360. The reconstituted reactant fluid continues to flow up into the overflow branch 224 that leads to an overflow chamber 218. Since the volume fluid that is injected by the blister can be imprecise, the overflow chamber may fill completely or may be partially filled.

Figure 9C:
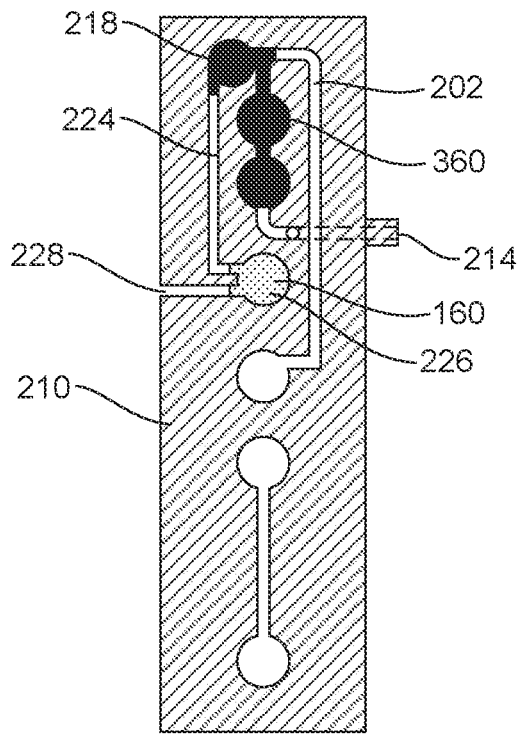

FIG. 9C shows the substrate 210 after the non-newtonian plugging fluid blister has been pressed. This injects non-newtonian plugging fluid 160 into the non-newtonian plugging fluid opening well 226. The non-newtonian plugging fluid forms a plug that blocks the air vent 228, which prevents the reconstituted reactant fluid 360 from flowing any farther along the overflow branch 224. After the non-newtonian plugging fluid has closed off the air vent in this way, the fluid outlet 214 is opened. The normally-closed valve blister is pressed, which breaks the sealing layer and opens a flow path from the air blister to the bypass branch 202. The air blister is then pressed to force air through the bypass branch. This air pushes the reconstituted reactant fluid out through the fluid outlet. The air bypasses the overflow branch, so any reconstituted reactant fluid that is in the overflow branch and the overflow chamber 218 is not dispensed from the fluid outlet.

Figure 9D:
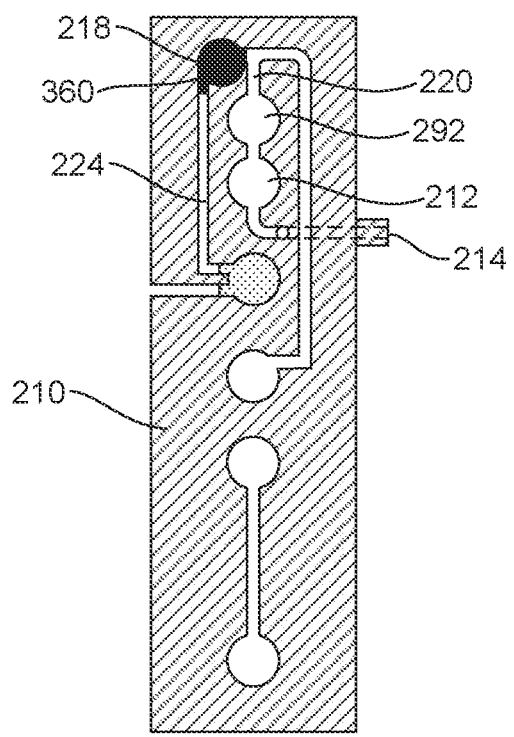

FIG. 9D shows the substrate after the air has forced the reconstituted reactant fluid from the microfluidic channel 220, pellet chamber 292, and opening well 212 out through the fluid outlet. As shown in the figure, some fluid remains behind in the overflow chamber and the overflow branch. The internal volume of the opening well, pellet chamber, and the microfluidic channel up to the branch point is constant. Therefore, the volume of fluid that is dispensed from this internal volume can also be constant. If the volume of fluid that is injected into the device from the blister has any variability, then the amount of fluid that flows into the overflow chamber and the overflow branch can vary while the volume of fluid that is ultimately dispensed from the fluid outlet can remain constant. Thus, the method illustrated in this example can remove the variability and dispense a metered volume of fluid.

In various examples, the methods of directing fluid flow can include any processes described above. In a specific example, a method of processing fluids can include the process depicted in FIGS. 9A-9D. Any of the devices, materials, and components described above can be used in the methods of directing fluid flow.

Definitions

It is noted that, as used in this specification and the appended claims, the singular forms "a," "an," and "the" include plural referents unless the context clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, "Bingham plastic" refers to a class of materials that behave as rigid bodies at low stress but which flow as a viscous fluid at high stress. The transition between the rigid body behavior and the viscous fluid behavior can occur at various different stress levels, depending on the particular Bingham plastic material. Bingham plastics can include greases, slurries, suspensions of pigments, and others.

As used herein, "viscoplastic" refers to a broader category of materials that can include Bingham plastics. Viscoplastic materials can experience irreversible plastic deformation when stress over a certain level is applied. When stress under this level is applied, the viscoplastic material can behave as a rigid body, as is the case with Bingham plastics, or the viscoplastic material can undergo reversible elastic deformation.

As used herein, "shear thinning fluid" refers to materials that behave as a fluid with a high viscosity when low stress is applied, but the viscosity of the fluid decreases when the stress is increased. Examples of shear thinning fluids can include polymer solutions, molten polymers, suspensions, colloids, and others.

As used herein, "curable fluids" refers to fluids that can undergo a curing process to increase the viscosity of the fluid and/or cause phase change from liquid to solid. The curing process can include thermal curing, chemical curing, ultraviolet radiation curing, or other curing methods. In some examples, curable fluids can include monomers that can polymerize to form polymers and/or polymers that can become crosslinked during the curing process. Examples of curable fluids can include two-part epoxy resins, two-part polyurethane resins, ultraviolet curing epoxies, ultraviolet curing acrylates, ultraviolet curing urethanes, ultraviolet curing thiols, and others.

As used herein, a plurality of items, structural elements, compositional elements, and/or materials may be presented in a common list for convenience. However, these lists should be construed as though individual members of the list are individually identified as separate and unique members. Thus, no individual member of such list should be construed as a de facto equivalent of any other member of the same list solely based on presentation in a common group without indications to the contrary.

Concentrations, amounts, and other numerical data may be expressed or presented herein in a range format. A range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting one numerical value. Furthermore, such an interpretation should apply regardless of the breadth of the range or the characteristics being described.

Example—Microfluidic Device

A microfluidic device was constructed according to the design shown in FIGS. 7A-7D and 9A-9D. A dried FOR master mix reactant pellet was placed in the pellet chamber before adhering the blister pack to the substrate surface. A red dye was also added to the pellet so that the liquid in the device would be colored red to allow for visual observation of the process. The substrate was made of transparent plastic, which allowed the red liquid to be visible through the substrate.

The microfluidic device included the substrate with a label layer, sealing layer, and flexible blister layer as shown in FIGS. 7A-7D. This device was placed in a system with a robotically-controlled piston for pressing the blisters. The system was used to press the blisters in a specific sequence. First, the opening blister portion of the reconstitution buffer blister was pressed. This punctured the sealing layer above the reconstitution buffer opening well, and a small amount of reconstitution buffer flowed into the well. Next, the main reservoir portion of the reconstitution buffer blister was pressed. This injected a larger volume of reconstitution buffer into the well. The amount of buffer was sufficient to flow up and fill the pellet chamber, and then flow into the overflow branch of the microfluidic channel and partially fill the over flow chamber. The pellet dissolved in the buffer to form reconstituted reactant fluid. Next, the normally-closed valve was opened by pressing the opening blister of the normally-closed valve. The stopcock on the fluid outlet was also opened at this time. The non-newtonian plugging fluid blister was pressed next, which injected non-newtonian plugging fluid into the non-newtonian plugging fluid opening well and blocked off the air vent. Finally, the air blister was pressed and the air from the air blister forced the reconstituted reactant fluid (except for the fluid that was in the overflow branch and the overflow chamber) out through the fluid outlet. The volume of fluid that was dispensed from the fluid outlet was then carefully measured.

This process was repeated 9 times and the volume of fluid dispensed was measured. It was found that average volume of fluid dispensed was 63 µL with a standard deviation of 2.6 µL The greatest volume dispensed out of the 9 runs was 67 µL and the smallest volume was 60 µL. This shows that the device can consistently dispense a precise amount of fluid.

While the present technology has been described with reference to certain examples, various modifications, changes, omissions, and substitutions can be made without departing from the spirit of the disclosure. The disclosure is not limited other than by the scope of the following claims.

What is claimed is:

1. A microfluidic valve, comprising:
a substrate having a microfluidic channel formed in the substrate;
a sealing layer over the microfluidic channel; and
a flexible blister layer over the sealing layer, wherein the flexible blister layer includes a blister formed as a distended portion with a blister volume between the flexible blister layer and the sealing layer;
wherein the microfluidic valve is actuatable by puncturing the sealing layer by pressing on the blister, wherein actuating the microfluidic valve blocks a fluid from flowing through the microfluidic channel.

2. The microfluidic valve of claim 1, wherein the microfluidic valve is a normally-open valve, wherein a non-newtonian plugging fluid is in the blister volume, wherein the blister is positioned to inject the non-newtonian plugging fluid into the microfluidic channel when the blister is pressed and the sealing layer is punctured, and wherein the non-newtonian plugging fluid has a sufficient viscosity to block fluid from flowing through the microfluidic channel.

3. The microfluidic valve of claim 1, wherein the substrate comprises a puncturing point beneath the blister oriented toward the sealing layer to puncture the sealing layer when the blister is pressed.

4. The microfluidic valve of claim 1, wherein the flexible blister layer comprises a puncturing point at the blister and oriented toward the sealing layer to puncture the sealing layer when the blister is pressed.

5. The microfluidic valve of claim 4, wherein the non-newtonian plugging fluid is in the blister volume at the puncturing point such that a single press of the blister punctures the sealing layer and injects the non-newtonian plugging fluid into the microfluidic channel.

6. The microfluidic valve of claim 1, wherein the microfluidic valve is a normally-open valve, wherein a non-newtonian plugging fluid is in the blister volume, and wherein the non-newtonian plugging fluid is a Bingham plastic, a viscoplastic, a shear thinning fluid, or a curable fluid.

7. A microfluidic valve, comprising:
a substrate having a first microfluidic channel formed in the substrate and a second microfluidic channel formed in the substrate;
a sealing layer over the microfluidic channel; and
a flexible blister layer over the sealing layer, wherein the flexible blister layer includes a blister formed as a distended portion with a blister volume between the flexible blister layer and the sealing layer;

wherein the microfluidic valve is a normally-closed valve, wherein the second microfluidic channel is in fluid communication with the blister, wherein the sealing layer separates the blister from fluid communication with the first microfluidic channel, and wherein puncturing the sealing layer places the blister into fluid communication with the first microfluidic channel to allow fluid to flow between the first microfluidic channel and the second microfluidic channel through the blister volume.

8. The microfluidic valve of claim 7, wherein the blister volume is initially filled with air.

9. The microfluidic valve of claim 1, further comprising an opening well formed in the substrate under the blister, wherein the opening well is in fluid communication with the microfluidic channel, and wherein the opening well has a greater depth, width, or both compared to the microfluidic channel.

10. A microfluidic device, comprising:
a substrate having a fluid flow microfluidic channel formed in the substrate; and
a microfluidic valve positioned in fluid communication with the fluid flow microfluidic channel such that the microfluidic valve initially allows or blocks fluid flow through the fluid flow microfluidic channel;
wherein the microfluidic valve comprises a sealing layer over the fluid flow microfluidic channel and a flexible blister layer over the sealing layer, wherein the flexible blister layer includes a blister formed as a distended portion with a blister volume between the flexible blister layer and the sealing layer;
wherein the microfluidic valve comprises, at or beneath the blister, a puncturing point oriented toward the sealing layer, wherein the microfluidic valve is actuatable by pressing on the blister to puncture the sealing layer, wherein the microfluidic valve is configured, when the microfluidic valve is actuated, to either switch (1) from allowing fluid flow through the microfluidic channel to blocking fluid flow through the microfluidic channel, or (2) from blocking fluid flow through the microfluidic channel to allowing fluid flow through the microfluidic channel.

11. The microfluidic device of claim 10, wherein the microfluidic valve is a normally-open valve configured to allow a fluid to flow through the fluid flow microfluidic channel when the microfluidic valve is not actuated and block the fluid from flowing through the microfluidic channel when the microfluidic valve is actuated, wherein a non-newtonian plugging fluid is in the blister volume, wherein the blister is positioned to inject the non-newtonian plugging fluid into the fluid flow microfluidic channel when the blister is pressed and the sealing layer is punctured, and wherein the non-newtonian plugging fluid has a sufficient viscosity to block fluid from flowing through the fluid flow microfluidic channel.

12. The microfluidic device of claim 11, further comprising a second microfluidic valve that is a normally-closed microfluidic valve, wherein the second microfluidic valve comprises a second blister formed in the flexible blister layer, wherein the substrate further comprises a second microfluidic channel formed in the substrate, wherein the second microfluidic channel is in fluid communication with the second blister, wherein the sealing layer separates the second blister from fluid communication with the fluid flow microfluidic channel, and wherein puncturing the sealing layer places the second blister into fluid communication with the fluid flow microfluidic channel to allow fluid to flow between the fluid flow microfluidic channel and the second microfluidic channel through the second blister volume.

13. A method of directing fluids, comprising:
flowing a fluid through a fluid flow microfluidic channel formed in a substrate, wherein a microfluidic valve is positioned in fluid communication with the fluid flow microfluidic channel such that the microfluidic valve initially allows or blocks fluid flow through the fluid flow microfluidic channel, wherein the microfluidic valve comprises a sealing layer over the fluid flow microfluidic channel and a flexible blister layer over the sealing layer, wherein the flexible blister layer includes a blister formed as a distended portion with a blister volume between the flexible blister layer and the sealing layer; and
actuating the microfluidic valve by puncturing the sealing layer by pressing on the blister, wherein the microfluidic valve is a normally-open valve, wherein flowing fluid through the fluid flow microfluidic channel is performed before actuating the microfluidic valve, and wherein actuating the microfluidic valve stops the fluid flow.

14. The method of claim 13, wherein the normally-open valve comprises a non-newtonian plugging fluid in the blister volume, wherein pressing the blister punctures the sealing layer and injects the non-newtonian plugging fluid into the fluid flow microfluidic channel, and wherein the non-newtonian plugging fluid has a sufficient viscosity to block fluid from flowing through the fluid flow microfluidic channel.

15. The method of claim 14, wherein flowing the fluid through the fluid flow microfluidic channel comprises flowing the fluid in a first direction, and wherein the method further comprises actuating a second microfluidic valve, which is a normally-closed valve, to allow the fluid to flow in a second direction, wherein the second microfluidic valve comprises a second blister formed in the flexible blister layer, wherein the substrate further comprises a second microfluidic channel formed in the substrate, wherein the second microfluidic channel is in fluid communication with the second blister, wherein the sealing layer separates the second blister from fluid communication with the fluid flow microfluidic channel, and wherein puncturing the sealing layer places the second blister into fluid communication with the fluid flow microfluidic channel to allow fluid to flow between the fluid flow microfluidic channel and the second microfluidic channel through the second blister volume.

16. The microfluidic valve of claim 1, wherein the substrate further comprises a pointed protrusion to puncture the sealing layer.

17. The microfluidic device of claim 10, wherein the puncturing point is a sharp protrusion.

18. The microfluidic device of claim 10, wherein the microfluidic valve is a normally-open valve configured to allow a fluid to flow through the fluid flow microfluidic channel when the microfluidic valve is not actuated and blocks the fluid from flowing through the microfluidic channel when the microfluidic valve is actuated.

19. The microfluidic device of claim 18, wherein a plugging fluid is in the blister volume, wherein the blister is positioned to inject the plugging fluid into the microfluidic channel when the blister is pressed and the sealing layer is punctured.

20. The microfluidic device of claim 18, wherein the microfluidic valve is a first microfluidic valve, and wherein the microfluidic device further comprises a second microfluidic valve that is a normally-closed valve.

\* \* \* \* \*